(12) United States Patent
Derstine et al.

(10) Patent No.: US 11,778,720 B2
(45) Date of Patent: Oct. 3, 2023

(54) HIGH EFFICIENCY LASER-SUSTAINED PLASMA LIGHT SOURCE WITH COLLECTION OF BROADBAND RADIATION

(71) Applicant: KLA Corporation, Milpitas, CA (US)

(72) Inventors: Matthew Derstine, Los Gatos, CA (US); Ilya Bezel, Mountain View, CA (US); Anatoly Shchemelinin, Bozeman, MT (US); Eugene Shifrin, Sunnyvale, CA (US)

(73) Assignee: KLA Corporation, Milpitas, CA (US)

( * ) Notice: Subject to any disclaimer, the term of this patent is extended or adjusted under 35 U.S.C. 154(b) by 75 days.

(21) Appl. No.: 17/028,902

(22) Filed: Sep. 22, 2020

(65) Prior Publication Data

US 2021/0022233 A1  Jan. 21, 2021

Related U.S. Application Data

(63) Continuation of application No. 15/187,590, filed on Jun. 20, 2016, now Pat. No. 10,887,974.

(60) Provisional application No. 62/290,593, filed on Feb. 3, 2016, provisional application No. 62/183,069, filed on Jun. 22, 2015.

(51) Int. Cl.
*H05G 2/00* (2006.01)
*H01S 3/131* (2006.01)
*H05H 1/46* (2006.01)

(52) U.S. Cl.
CPC ........... *H05G 2/008* (2013.01); *H01S 3/1312* (2013.01); *H05H 1/46* (2013.01)

(58) Field of Classification Search
CPC ..................................................... H05G 2/008
See application file for complete search history.

(56) References Cited

U.S. PATENT DOCUMENTS

| | | | |
|---|---|---|---|
| 4,925,259 | A | 5/1990 | Emmett |
| 6,051,841 | A | 4/2000 | Partlo |

(Continued)

FOREIGN PATENT DOCUMENTS

| | | | |
|---|---|---|---|
| CN | 103782458 A | 5/2014 | |
| CN | 104380203 B | 9/2017 | |

(Continued)

OTHER PUBLICATIONS

Office Action in Japanese Application No. 2020-162483 dated Aug. 24, 2021, 12 pages (with English Translation).

(Continued)

*Primary Examiner* — David E Smith
(74) *Attorney, Agent, or Firm* — Suiter Swantz pc llo

(57) ABSTRACT

A system for generating laser sustained broadband light includes a pump source configured to generate a pumping beam, a gas containment structure for containing a gas and a multi-pass optical assembly. The multi-pass optical assembly includes one or more optical elements configured to perform a plurality of passes of the pumping beam through a portion of the gas to sustain a broadband-light-emitting plasma. The one or more optical elements are arranged to collect an unabsorbed portion of the pumping beam transmitted through the plasma and direct the collected unabsorbed portion of the pumping beam back into the portion of the gas.

25 Claims, 23 Drawing Sheets

(56) References Cited

U.S. PATENT DOCUMENTS

| | | | |
|---|---|---|---|
| 6,312,144 B1 * | 11/2001 | Li | G02B 6/0006 |
| | | | 362/302 |
| 6,384,368 B1 | 5/2002 | Sokol | |
| 6,487,003 B1 | 11/2002 | Suzuki et al. | |
| 7,430,231 B2 | 9/2008 | Luo et al. | |
| 7,435,982 B2 | 10/2008 | Smith | |
| 7,705,331 B1 * | 4/2010 | Kirk | H01J 65/04 |
| | | | 250/493.1 |
| 7,989,786 B2 | 8/2011 | Smith et al. | |
| 8,148,900 B1 | 4/2012 | Kirk et al. | |
| 8,182,127 B2 | 5/2012 | Yasuda et al. | |
| 8,477,825 B2 | 7/2013 | Herwig et al. | |
| 8,582,612 B2 | 11/2013 | Lundquist et al. | |
| 8,810,902 B2 | 8/2014 | Sandstrom | |
| 8,853,655 B2 | 10/2014 | Bezel et al. | |
| 8,901,523 B1 * | 12/2014 | Ershov | H01J 37/32477 |
| | | | 250/493.1 |
| 9,048,000 B2 | 6/2015 | Smith | |
| 9,185,786 B2 | 11/2015 | Smith | |
| 9,775,226 B1 | 9/2017 | Bezel et al. | |
| 10,887,974 B2 * | 1/2021 | Derstine | H01S 3/1312 |
| 2005/0258768 A1 * | 11/2005 | Gaebel | H05G 2/003 |
| | | | 315/111.81 |
| 2006/0120429 A1 | 6/2006 | Murakami | |
| 2006/0192152 A1 | 8/2006 | Ershov et al. | |
| 2007/0228300 A1 * | 10/2007 | Smith | H01J 61/54 |
| | | | 250/504 R |
| 2009/0057567 A1 | 3/2009 | Bykanov et al. | |
| 2010/0176310 A1 | 7/2010 | Moriya et al. | |
| 2010/0181503 A1 | 7/2010 | Yanagida et al. | |
| 2011/0180734 A1 | 7/2011 | Moriya et al. | |
| 2011/0181191 A1 | 7/2011 | Smith et al. | |
| 2011/0204265 A1 | 8/2011 | Smith et al. | |
| 2012/0068091 A1 | 3/2012 | Endo et al. | |
| 2012/0091893 A1 | 4/2012 | Yanagida et al. | |
| 2012/0119116 A1 | 5/2012 | Kakizaki et al. | |
| 2012/0145930 A1 * | 6/2012 | Kuwabara | H05G 2/003 |
| | | | 250/504 R |
| 2012/0212804 A1 | 8/2012 | Sarkisyan et al. | |
| 2013/0003384 A1 | 1/2013 | Bezel et al. | |
| 2013/0021602 A1 | 1/2013 | Dribinski et al. | |
| 2013/0106275 A1 | 5/2013 | Chimmalgi et al. | |
| 2013/0329204 A1 | 12/2013 | Pellemans et al. | |
| 2014/0239202 A1 | 8/2014 | Bezel et al. | |
| 2014/0239795 A1 | 8/2014 | Kim et al. | |
| 2014/0240951 A1 | 8/2014 | Brady et al. | |
| 2014/0291546 A1 | 10/2014 | Bezel et al. | |
| 2014/0377476 A1 | 12/2014 | Mistry | |
| 2015/0049778 A1 | 2/2015 | Shchemelinin et al. | |
| 2015/0264792 A1 | 9/2015 | Suzuki et al. | |
| 2015/0282288 A1 | 10/2015 | Bezel et al. | |
| 2015/0311058 A1 | 10/2015 | Antsiferov et al. | |
| 2016/0116332 A1 * | 4/2016 | Wu | G03F 7/70033 |
| | | | 250/504 R |

FOREIGN PATENT DOCUMENTS

| | | |
|---|---|---|
| JP | H08327794 A | 12/1996 |
| JP | 2001143893 A | 5/2001 |
| JP | 2002043220 A | 2/2002 |
| JP | 2007527117 A | 9/2007 |
| JP | 2010103104 A | 5/2010 |
| JP | 2010538420 A | 12/2010 |
| JP | 2011082473 A | 4/2011 |
| JP | 2014521991 A | 8/2014 |
| KR | 1020140108396 A | 9/2014 |
| TW | 201515519 A | 4/2015 |
| WO | 2011069881 A1 | 6/2011 |
| WO | 2013066576 A2 | 5/2013 |
| WO | 2015023882 A1 | 2/2015 |
| WO | 2015089424 A1 | 6/2015 |

OTHER PUBLICATIONS

Office Action dated Jan. 17, 2019 for EP Patent Application No. 16815239.5.

Office Action dated Jul. 26, 2019 for TW Application No. 105119595.

Office Action dated Jun. 4, 2019 for Chinese Patent Application No. 201680032513.8.

Office Action dated Mar. 10, 2020 for JP Patent Application No. 2017-566269.

PCT International Search Report for Application No. PCT/US2016/038812 dated Sep. 21, 2016, 3 pages.

Wandt, Christoph, "Development of a Joule-class Yb:YAG amplifier and its implementation in a CPA system generating 1 TW pulses", Dissertation an der Fakultat fur Physik der Ludwig-Maximilians-Universitat, Munchen, May 22, 2014.

Office Action in Japanese Application No. 2020-162483 dated Mar. 29, 2022, 3 pages (English Version).

Korean Intellectual Property Office, Office Action dated Mar. 27, 2023, received in Korean Application No. 10-2018-7001856, 26 pages (including translation).

* cited by examiner

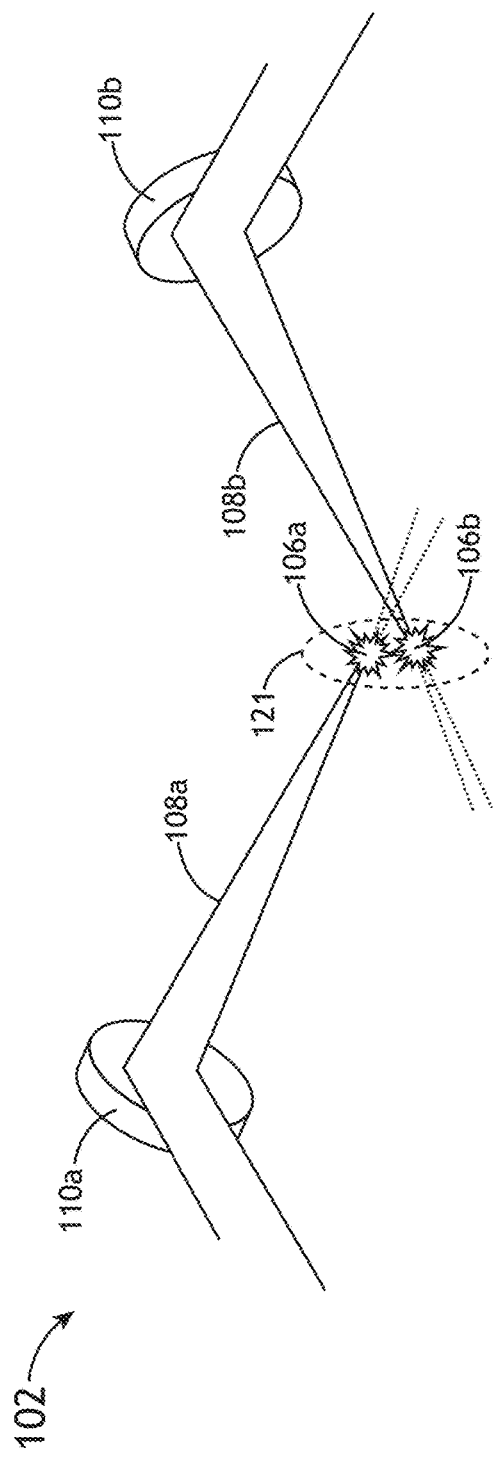
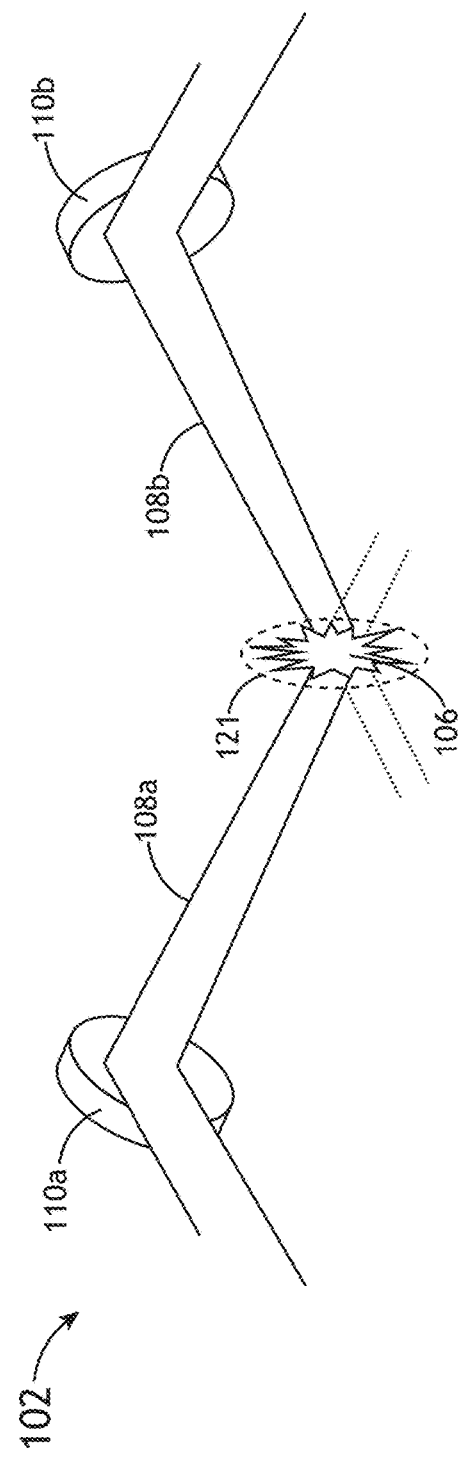

HIGH EFFICIENCY LASER-SUSTAINED PLASMA LIGHT SOURCE WITH COLLECTION OF BROADBAND RADIATION

CROSS-REFERENCE TO RELATED APPLICATIONS

The present application is related to and claims the benefit of the earliest available effective filing date(s) from the following listed application(s): the present application constitutes a divisional application of U.S. patent application Ser. No. 15/187,590, filed on Jun. 20, 2016, which constitutes a regular (non-provisional) patent application of U.S. Provisional Patent Application No. 62/183,069, filed Jun. 22, 2015; and U.S. Provisional Patent Application No. 62/290,593, filed Feb. 3, 2016, whereby each of the applications listed herein are incorporated by reference in their entirety.

TECHNICAL FIELD

The present invention generally relates to laser-sustained plasma light source, and, more particularly, to a multi-pass laser-sustained plasma light source.

BACKGROUND

As the demand for integrated circuits having ever-smaller device features continues to increase, the need for improved illumination sources used for inspection of these ever-shrinking devices continues to grow. One such illumination source includes a laser-sustained plasma source. Laser-sustained plasma light sources are capable of producing high-power broadband light. Laser-sustained light sources operate by focusing laser radiation into a gas volume in order to excite the gas, such as argon or xenon, into a plasma state, which is capable of emitting light. This effect is typically referred to as "pumping" the plasma.

Plasmas sustained with continuous wave (CW) radiation often operate at sufficiently low densities that the plasma is substantially transparent to the pump light used. As a result, the broadband light emitted by the plasma is much less bright than the theoretical black body limit.

Several approaches have been employed to address this problem for low etendue optical systems. One approach involves addressing the low density of the plasma by using higher pressure lamps. This approach has had limited success as it results in a growth of the plasma. An additional approach involves pumping the plasma with a low numerical aperture (NA) laser to create an elongated plasma. By collecting the broadband light along the elongation direction, a brightness approaching the black body can theoretically be obtained. Geometries that separate the pumping and collection have been proposed to address problems with mismatches between laser absorption and DUV/VUV emission. In both implementations, the elongated plasma emits a significant light that is never used. Therefore, it would be desirable to provide a system and method for curing the shortcomings of previous approaches such as those identified above.

SUMMARY

A multi-pass laser-sustained plasma system for generating broadband light is disclosed, in accordance with one or more embodiments of the present disclosure. In one embodiment, the system includes a pump source configured to generate a pumping beam. In another embodiment, the system includes a gas containment structure for containing a gas. In another embodiment, the system includes a multi-pass optical assembly. In another embodiment, the multi-pass optical assembly includes one or more optical elements configured to perform a plurality of passes of the pumping beam through a portion of the gas to sustain a broadband-light-emitting plasma. In another embodiment, the one or more optical elements are arranged to collect an unabsorbed portion of the pumping beam transmitted through the plasma and direct the collected unabsorbed portion of the pumping beam back into the portion of the gas.

A multi-pass laser-sustained plasma system for generating broadband light is disclosed, in accordance with one or more embodiments of the present disclosure. In one embodiment, the system includes a pump source configured to generate a pumping beam. In another embodiment, the system includes a gas containment structure for containing a gas. In another embodiment, the system includes an optical assembly. In another embodiment, the optical sub-system includes one or more optical elements configured to perform one or more passes of the pumping beam through a portion of the gas to sustain a broadband-light-emitting plasma. In another embodiment, the system includes a collection assembly including one or more collection optics. In another embodiment, the system includes one or more collection optics configured to direct at least a portion of broadband radiation emitted by the plasma to one or more downstream optical elements. In another embodiment, the system includes one or more collection optical elements configured to collect and direct at least a portion of broadband radiation emitted by the plasma back to the plasma.

A multi-pass laser-sustained plasma system for generating broadband light is disclosed, in accordance with one or more embodiments of the present disclosure. In one embodiment, the system includes a pump source configured to generate a pumping beam. In another embodiment, the system includes a reflector assembly configured to contain a gas. In another embodiment, the reflector assembly includes one or more entrance apertures for receiving the pumping beam from the pump source. In another embodiment, the pumping beam sustains a plasma within a portion of the gas. In another embodiment, the plasma emits broadband radiation. In another embodiment, the internal surface of the reflector assembly is configured to collect at least a portion of the broadband radiation emitted by the plasma and direct the collected broadband radiation back to the plasma.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIGS. 1J-1K illustrate the control of the shape of the plasma using the multi-pass optical assembly, in accordance with one or more embodiments of the present disclosure.

FIG. 1O illustrate the multi-pass optical assembly equipped with one or more polarizer elements, in accordance with one or more embodiments of the present disclosure.

DETAILED DESCRIPTION OF THE INVENTION

Figure 1A:
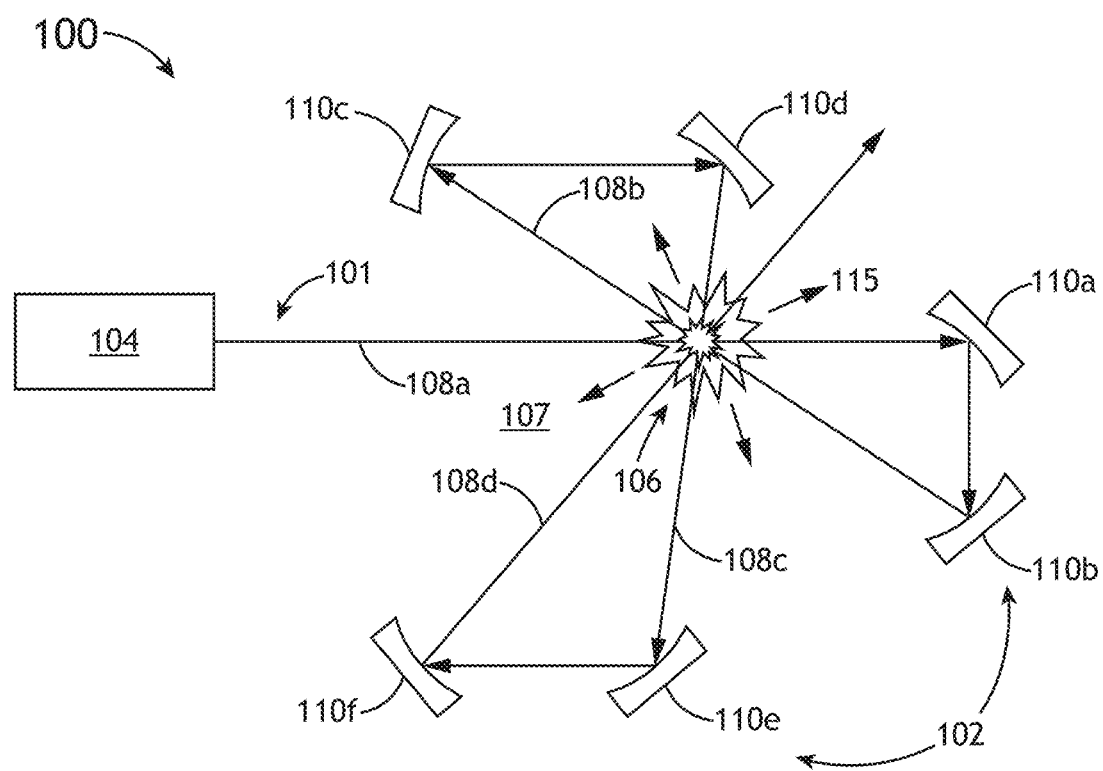
FIGS. 1A-1F illustrate simplified schematic views of a multi-pass laser-sustained plasma system, in accordance with one or more embodiments of the present disclosure.

Reference will now be made in detail to the subject matter disclosed, which is illustrated in the accompanying drawings.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

Referring generally to FIGS. 1A through 2H, a high efficiency laser sustained plasma (LSP) light source is disclosed, in accordance with one or more embodiment of the present disclosure. Embodiments of the present disclosure are directed to a multi-pass laser sustained plasma system including multiple discrete optical elements for recycling pump illumination and/or broadband light. Additional embodiments of the present disclosure are directed to a multi-pass laser sustained plasma system including an ellipsoidal reflector assembly for recycling pump illumination and/or broadband light. The recycling of pump illumination and/or plasma-emitted broadband back into the plasma to further pump the plasma results in an improvement in efficiency of the embodiments of the present disclosure relative to non-recycling systems. In addition, the combination of multiple images of the plasma using the discrete optical elements or reflector assembly of the present disclosure may result in an improvement in the brightness of the broadband output.

The generation of a light-sustained plasma is also generally described in U.S. Pat. No. 7,435,982, issued on Oct. 14, 2008, which is incorporated by reference herein in the entirety. The generation of plasma is also generally described in U.S. Pat. No. 7,786,455, issued on Aug. 31, 2010, which is incorporated by reference herein in the entirety. The generation of plasma is also generally described in U.S. Pat. No. 7,989,786, issued on Aug. 2, 2011, which is incorporated by reference herein in the entirety. The generation of plasma is also generally described in U.S. Pat. No. 8,182,127, issued on May 22, 2012, which is incorporated by reference herein in the entirety. The generation of plasma is also generally described in U.S. Pat. No. 8,309,943, issued on Nov. 13, 2012, which is incorporated by reference herein in the entirety. The generation of plasma is also generally described in U.S. Pat. No. 8,525,138, issued on Feb. 9, 2013, which is incorporated by reference herein in the entirety. The generation of plasma is also generally described in U.S. Pat. No. 8,921,814, issued on Dec. 30, 2014, which is incorporated by reference herein in the entirety. The generation of plasma is also generally described in U.S. Pat. No. 9,318,311, issued on Apr. 19, 2016, which is incorporated by reference herein in the entirety. The generation of plasma is also generally described in U.S. Patent Publication No. 2014/029154, filed on Mar. 25, 2014, which is incorporated by reference herein in the entirety. Transverse pumping of a light-sustained plasma is generally described in U.S. Patent Publication No. 2015/0282288, filed on Mar. 31, 2015, which is incorporated by reference herein in the entirety. In a general sense, the various embodiments of the present disclosure should be interpreted to extend to any plasma-based light source known in the art. An optical system used in the context of plasma generation is described generally in U.S. Pat. No. 7,705,331, issued on Apr. 27, 2010, which is incorporated herein by reference in the entirety.

FIGS. 1A-1O illustrate a multi-pass system 100 for efficiently generating LSP plasma, in accordance with one or more embodiment of the present disclosure. In one embodiment, as shown in FIG. 1A, the system 100 includes pump source 104 (e.g., one or more lasers) configured to generate a beam 101 of pumping illumination for sustaining plasma 106. The pump beam 101 is suitable for sustaining a plasma 106 within a volume of gas 107. The plasma 106, in response to the optical pumping from the pump beam 101, emits broadband radiation 115. In another embodiment, the system 100 includes a multi-pass optical assembly 102. In one embodiment, the multi-pass optical assembly 102 includes one or more optical elements 110a-110f configured to perform multiple passes 108a-108d of the pumping beam through a portion of gas 107 to sustain the plasma 106. In another embodiment, the one or more optical elements 110a-110f are arranged to collect an unabsorbed portion of the pumping beam transmitted through the plasma 106 and direct the collected unabsorbed portion of the pumping beam back into the plasma 106 and/or gas 107 near the plasma 106. As noted previously herein, the multi-pass optical assembly 102 is particularly useful in low pressure settings where the absorption of pump illumination by the plasma 106 is small. The one or more optical elements 110a-110f of the multi-pass assembly 102 provide for the "recycling" of the pump illumination, whereby the unabsorbed portion of the pump beam redirects the unabsorbed pump beam and back into to the plasma 106 and/or the gas 107 proximate to the plasma 106.

In one embodiment, as shown in FIG. 1A, the multi-pass optical assembly 102 includes two or more optical elements 110a-110f. The two or more optical elements 110a-110f may include any optical elements known in the art capable of collecting plasma illumination transmitted through the plasma 106 and redirecting the pump illumination back into the plasma 106 and/or gas 107 near the plasma 106. For example, the two or more optical elements 110a-110f may include, but are not limited to, one or more reflective optical elements (e.g., mirrors) and/or one or more transmissive optical elements (e.g., lenses). For example, as depicted in FIG. 1A, the two or more optical elements 110a-110f may include, but are not limited to, a set of mirrors 110a-110f. For instance, the set of mirrors 110a-110f may include, but is not limited to, one or more turning mirrors. The set of mirrors 110a-110f may include any type of mirror known in the art. For example, the set of mirrors 110a-110f may include one or more of the following: one or more elliptical mirrors, one or more parabolic mirrors, one or more spherical mirrors or one or more flat mirrors.

As shown in FIG. 1A, the pump beam 101 performs a first pass 108a of the plasma 106. A first portion of the initial pass 108a of the pump beam 101 is absorbed by the plasma 106 and/or gas 107 proximate to the plasma 106. A second portion of the initial pass 108a of the beam 101 is transmitted through the partially transparent plasma 106 and is collected by mirror 110a. Mirror 110a then directs the collected illumination to a second mirror 110b, which, in turn, performs a second pass 108b of the pump beam 101 through the plasma 106. Again, a first portion of the second pass 108b of the beam 101 is absorbed by the plasma 106 and/or gas 107 proximate to the plasma 106, while a second portion of the second pass 108b of the beam 101 is transmitted through the plasma 106. This process is repeated multiple times via mirrors 110c-110c to execute passes 108c and 108d of the pump beam 101 through the plasma 106. It is noted that the scope of the present disclosure is not limited to the number or arrangement of mirrors depicted in FIG. 1A, which is provided merely for illustrative purposes. It is recognized herein that the multi-pass assembly 102 may include any number of optical elements (e.g., reflective and/or transmissive) positioned and orientated in any manner to accomplish multiple passes of pump illumination through the plasma 106.

In another embodiment, the pump source 104 includes one or more lasers. The pump source 104 may include any laser system known in the art. For instance, the pump source 104 may include any laser system known in the art capable of emitting radiation in the infrared, visible and/or ultraviolet portions of the electromagnetic spectrum.

In one embodiment, the pump source 104 may include a laser system configured to emit continuous wave (CW) laser radiation. For example, the pump source 104 may include one or more CW infrared laser sources. For instance, in settings where the gas 107 is or includes argon, the pump source 104 may include a CW laser (e.g., fiber laser or disc Yb laser) configured to emit radiation at 1069 nm. It is noted that this wavelength fits to a 1068 nm absorption line in argon and as such is particularly useful for pumping argon gas. It is noted herein that the above description of a CW laser is not limiting and any laser known in the art may be implemented in the context of the present invention.

In another embodiment, the pump source 104 may include one or more lasers configured to provide laser light at substantially a constant power to the plasma 106. In another embodiment, the pump source 104 may include one or more modulated lasers configured to provide modulated laser light to the plasma 106. In another embodiment, the pump source 104 may include one or more pulsed lasers configured to provide pulsed laser light to the plasma.

In another embodiment, the pump source 104 may include one or more diode lasers. For example, the pump source 104 may include one or more diode lasers emitting radiation at a wavelength corresponding with any one or more absorption lines of the species of the gas 107. A diode laser of pump source 104 may be selected for implementation such that the wavelength of the diode laser is tuned to any absorption line of any plasma (e.g., ionic transition line) or any absorption line of the plasma-producing gas (e.g., highly excited neutral transition line) known in the art. As such, the choice of a given diode laser (or set of diode lasers) will depend on the type of gas 107 used in system 100.

In another embodiment, the pump source 104 may include an ion laser. For example, the pump source 104 may include any noble gas ion laser known in the art. For instance, in the case of an argon-based plasma, the pump source 104 used to pump argon ions may include an Ar+ laser. In another embodiment, the pump source 104 may include one or more frequency converted laser systems. For example, the pump source 104 may include a Nd:YAG or Nd:YLF laser having a power level exceeding 100 watts. In another embodiment, the pump source 104 may include a disk laser. In another embodiment, the pump source 104 may include a fiber laser. In another embodiment, the pump source 104 may include a broadband laser.

In another embodiment, the pump source 104 may include one or more non-laser sources. The pump source 104 may include any non-laser light source known in the art. For instance, the pump source 104 may include any non-laser system known in the art capable of emitting radiation discretely or continuously in the infrared, visible or ultraviolet portions of the electromagnetic spectrum.

In another embodiment, the pump source 104 may include two or more light sources. In one embodiment, the pump source 104 may include two or more lasers. For example, the pump source 104 (or "sources") may include multiple diode lasers. In another embodiment, each of the two or more lasers may emit laser radiation tuned to a different absorption line of the gas or plasma within system 100.

Figure 1B:
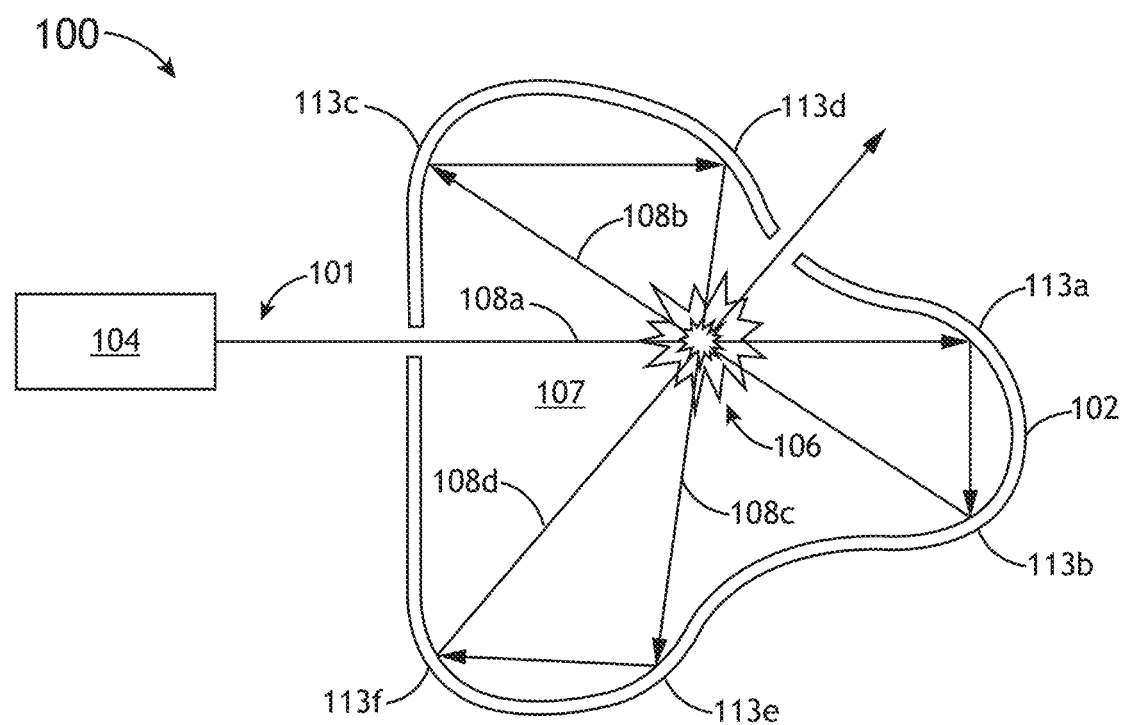

FIG. 1B illustrates the multi-pass assembly 102 consisting of a single reflective surface, in accordance with one or more embodiments of the present disclosure. In one embodiment, the multi-pass assembly 102 includes a reflective surface having a first portion and at least a second portion, arranged to collect an unabsorbed portion of the pump beam 101 and redirect the collected unabsorbed portion of the pump beam back into the plasma 106 and/or the gas 107 proximate to the plasma 106. In this embodiment, the reflective surface may consist of a single mirror having a complex shape, whereby the first portion of the mirror and at least the second portion of the mirror function as independent mirrors to perform multiple passes of the pump illumination through the plasma 106. The single reflective surface may be constructed so as to function in a manner similar to any of the embodiments of the present disclosure that include independent mirrors. In this regard, the single reflective surface may include multiple portions that replicate the independent mirrors of the various embodiments of the present disclosure. For example, as shown in FIG. 1B, the reflective surface may include, but is not limited to, multiple portions 113a-113f, which serve to collect unabsorbed pump illumination transmitted through the plasma 106 and redirect the collected pump illumination back into the plasma 106 and/or gas 107 proximate to the plasma 106. The shape and configuration of the single reflective surface of FIG. 1B should not be interpreted as limitations on the present disclosure and are provided merely for illustrative purposes. It is noted herein that the configuration of the reflective portions of the single reflective surface FIG. 1B may be extended to any shape, number and/or position of the multiple reflection portions (e.g., 113a-113f). In another embodiment, the single reflective surface may be formed from multiple components (e.g., first half and second half) that fit together. In another embodiment, the single reflective surface may be configured to serve as a gas containment element or vessel for containing the gas 107.

Figure 1C:
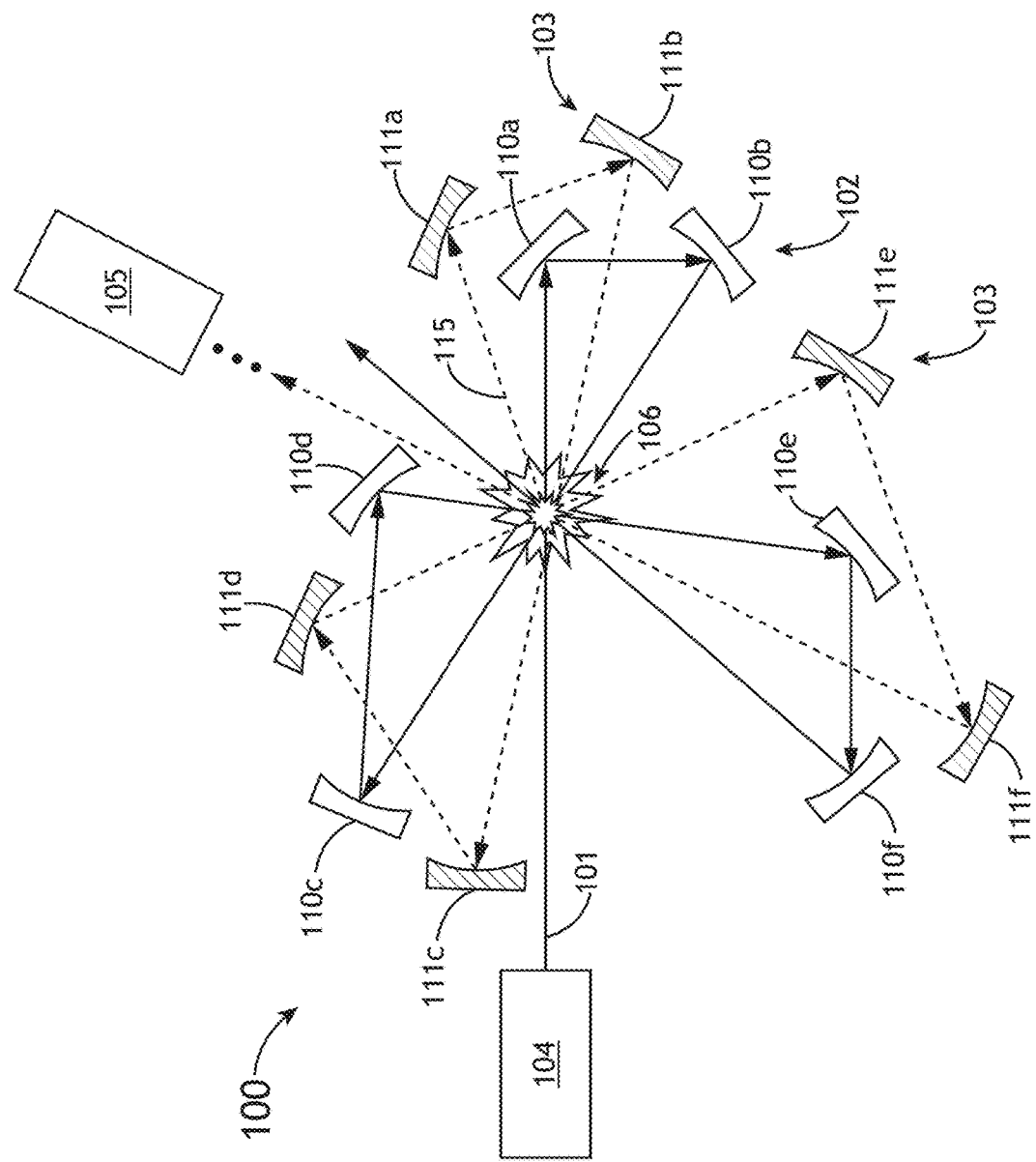

FIG. 1C illustrates system 100 equipped with a set of collection optics 103, in accordance with one or more embodiments of the present disclosure. In one embodiment, the set of collection optics 103 includes one or more collection optical elements 111a-111f configured to direct broadband radiation 115 emitted by the plasma 106 to one or more downstream optical elements 105 such as, but not limited to, a homogenizer, lens, mirror, filter, and/or an aperture. In this sense, the collection optical elements 111a-111f serve to combine multiple images of the plasma 106, which results in a broadband output having increased brightness.

In one embodiment, as depicted in FIG. 1C, the collection optical elements 111a-111f may be arranged in the same plane as the multi-pass optical elements 110a-110f. In this embodiment, the collection optical elements 111a-111f are interspersed between the multi-pass optical elements 110a-110f so as not to interfere with the line of sign associated with the multi-pass optical elements 110a-110f. As broadband light 115 is emitted by the plasma 106 a portion of the light 115 is collected by a first collection element 111a and directed back to the plasma 106 and/or gas 107 proximate to the plasma 106 via a second collection element 111b. This process can be repeated any number of times via additional collection optical elements 111c-111f to carry out additional passes through the plasma 106 and/or gas 107 proximate to the plasma 106.

It is noted that only a single reflection path has been shown for the collected broadband radiation 115, starting with collection optical element 111a. It is recognized herein that broadband radiation may initially be collected (prior to any redirection) by any one of the collection optical elements 111b-111f. It is further noted that broadband light starting a reflection path with any of the elements 111b-111f will experience fewer passes through the plasma 106 than broadband light initiated at the collection element 111a.

The number and configuration of collection optical elements 111a-111f of FIG. 1C should not be interpreted as a limitation on the scope of the present disclosure. Rather, the arrangement depicted in FIG. 1C is provided merely for illustrative purposes. It is noted that the collection optics 103 may consist of any optical arrangement suitable for collecting broadband light 115 emitted by the plasma 106 and combining multiple images of the plasma to increase the brightness of the broadband output.

In one embodiment, while not shown, the collection optics 103 may be arranged out of the plane defined by the multi-pass optical elements 102. In this embodiment, the collection optical elements 111a-111f may be arranged in an optical plane different than the optical plane define by the multi-pass optical elements 110a-110f. For example, the plane of the collection optical elements 111a-111f may be arranged at 90° relative to the plane defined by the multi-pass optical elements 110a-110f.

In another embodiment, while not shown, the collection optics 103 may include a single collector element. For example, the single collect element may consist of a single reflective surface, similar to the embodiment of FIG. 1B, and is configured to collect broadband light 115 emitted by the plasma 106. In turn, the reflective surface of the collector element may act to combine multiple images of the plasma 106 to provide a broadband output with increased brightness. In one embodiment, the multi-pass assembly 102 may be positioned within an internal volume of the single collector element.

In another embodiment, the multi-pass assembly 102 and the collection assembly 103 may be integrated within a single unit. In this regard, a single reflective surface may perform multi-passes of the pump beam 101 through the plasma 106 and/or gas proximate to the plasma 106, while also acting to combine multiple images of the plasma 106 to increase overall brightness of the broadband output. In this regard, the single reflective unit acts as both the multi-pass assembly 102 and the collection assembly 103. One such arrangement includes an ellipsoid reflector assembly, discuss further herein (see FIGS. 2A-2H).

Figure 1D:
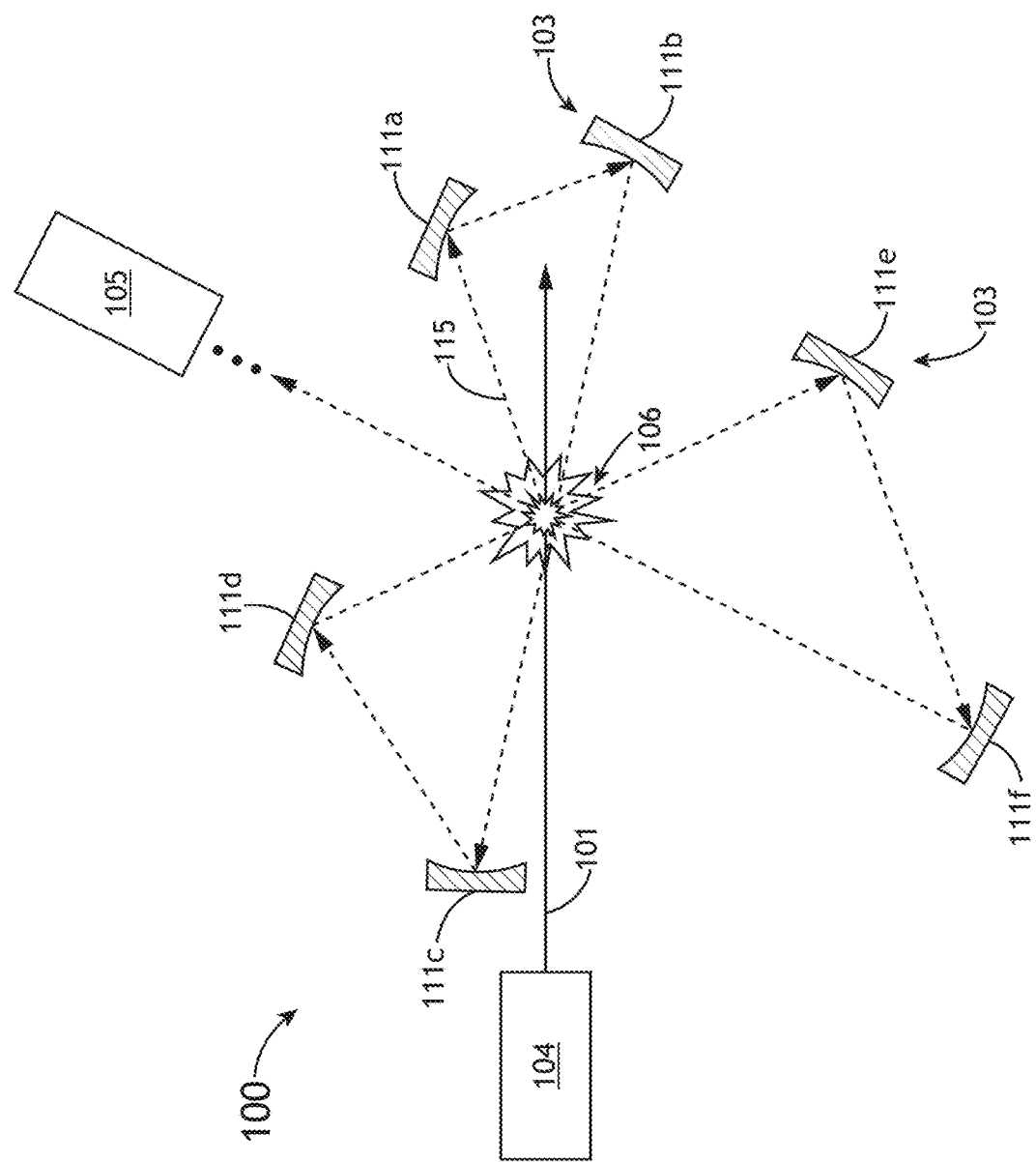

FIG. 1D illustrates a system 100 configured in a single pump pass mode, in accordance with one or more embodiments of the present disclosure. For example, as shown in FIG. 1D, the pump illumination 104 may pass through the plasma 106 a single time. In another embodiment, the collection optical assembly 103 may collect the broadband 115 light emitted by the pump illumination and redirect it back to the plasma 106.

The collector assembly 103 (or the integrated multi-pass/collector assembly) may collect one or more of visible, NUV, UV, DUV, VUV and/or EUV radiation emitted by plasma 106 and direct the broadband illumination 115 to one or more downstream optical elements. In this regard, the collector assembly 103 may deliver visible, NUV, UV, DUV, VUV and/or EUV radiation to downstream optical elements of any optical characterization system known in the art, such as, but not limited to, an inspection tool or a metrology tool. In this regard, the broadband output 115 may be coupled to the illumination optics of an inspection tool and/or metrology tool.

Referring again to FIG. 1C, in one embodiment, one or more of the optical elements 110a-110f of the multi-pass assembly 102 and/or one or more of the collection elements 111a-111f of the collection assembly 103 are selectively transmissive one or more selected wavelengths of light. For example, one or more of the optical elements 110a-110f and/or one or more of the collection elements 111a-111f may be transparent to one or more spectral regions of the broadband radiation 115 emitted by the plasma 106. For instance, the one or more of the optical elements 110a-110f may be transparent to one or more spectral regions of the broadband radiation 115 targeted for collection by the collection assembly 103. In one embodiment, one or more of the optical elements 110a-110f of the multi-pass assembly 102 and/or one or more of the collection elements 111a-111f of the collection assembly 103 are selectively absorptive of one or more selected wavelengths of light. For example, one or more of the optical elements 110a-110f and/or one or more of the collection elements 111a-111f may absorb one or more spectral regions of the broadband radiation 115 emitted by the plasma 106. In another embodiment, one or more of the optical elements 110a-110f of the multi-pass assembly 102 and/or one or more collection elements 111a-111f of the collection assembly 103 are selectively reflective of one or more selected wavelengths of light. For example, one or more of the optical elements 110a-110f and/or one or more collection optics 111a-111f may reflect one or more spectral regions of the broadband radiation 115 emitted by the plasma 106 back to the plasma 106. Further, one or more of the optical elements 110a-110f of the multi-pass assembly 102 and/or one or more collection elements 111a-111f of the collection assembly 103 may selectively reflect one or more selected wavelengths of broadband light 115 back to the plasma 106, while selectively transmitting one or more additional selected wavelengths of broadband light 115 (so that the additional selected wavelengths of light are not reflected back to the plasma). For instance, the one or more of the optical elements 110a-110f of the multi-pass assembly 102 may be absorptive of one or more spectral regions of the broadband radiation 115 targeted for collection by the collection assembly 103.

It is noted herein that the volume of gas 107 from which plasma 106 is initiated and maintained may be contained in any gas containment structure or vessel known in the art of plasma generation.

Figure 1E:
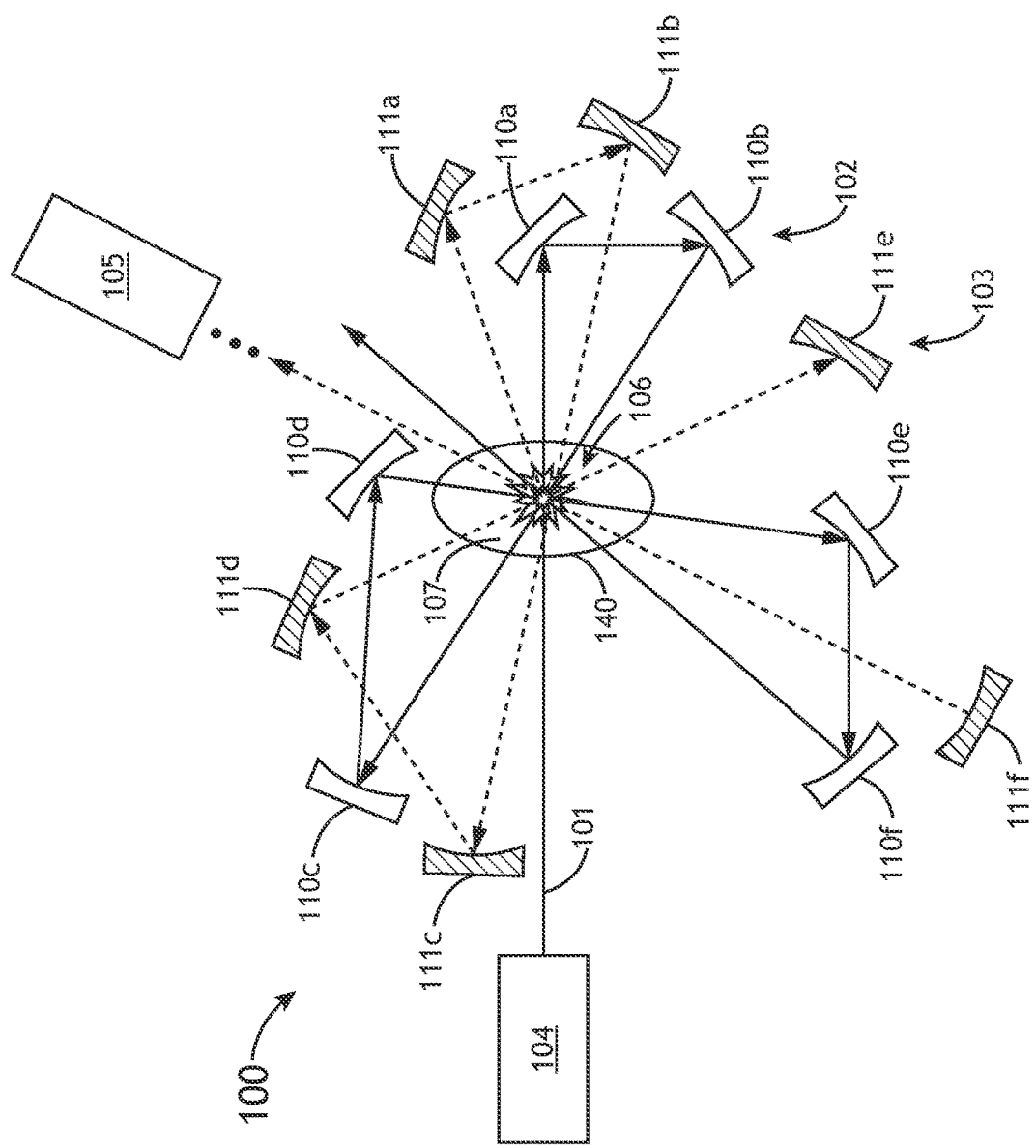

FIG. 1E illustrates system 100 equipped with a plasma bulb and/or cell 140 for containing gas 107, in accordance with one embodiment of the present disclosure. In one embodiment, the gas containment structure is a plasma bulb. The use of a plasma bulb is described in at least in U.S. patent application Ser. No. 11/695,348, filed on Apr. 2, 2007; U.S. patent application Ser. No. 11/395,523, filed on Mar. 31, 2006; and U.S. patent application Ser. No. 13/647,680, filed on Oct. 9, 2012, which are each incorporated previously herein by reference in the entirety. In another embodiment, the gas containment structure is a plasma cell. In the case of a plasma cell, the plasma cell may include, but is not limited to, a transmission element arranged in combination with one or more flanges for containing the gas 107. The use of a flanged plasma cell is described in at least U.S. patent application Ser. No. 14/231,196, filed on Mar. 31, 2014; and U.S. patent application Ser. No. 14/288,092, filed on May 27, 2014, which are each incorporated previously herein by reference in the entirety.

Figure 1F:
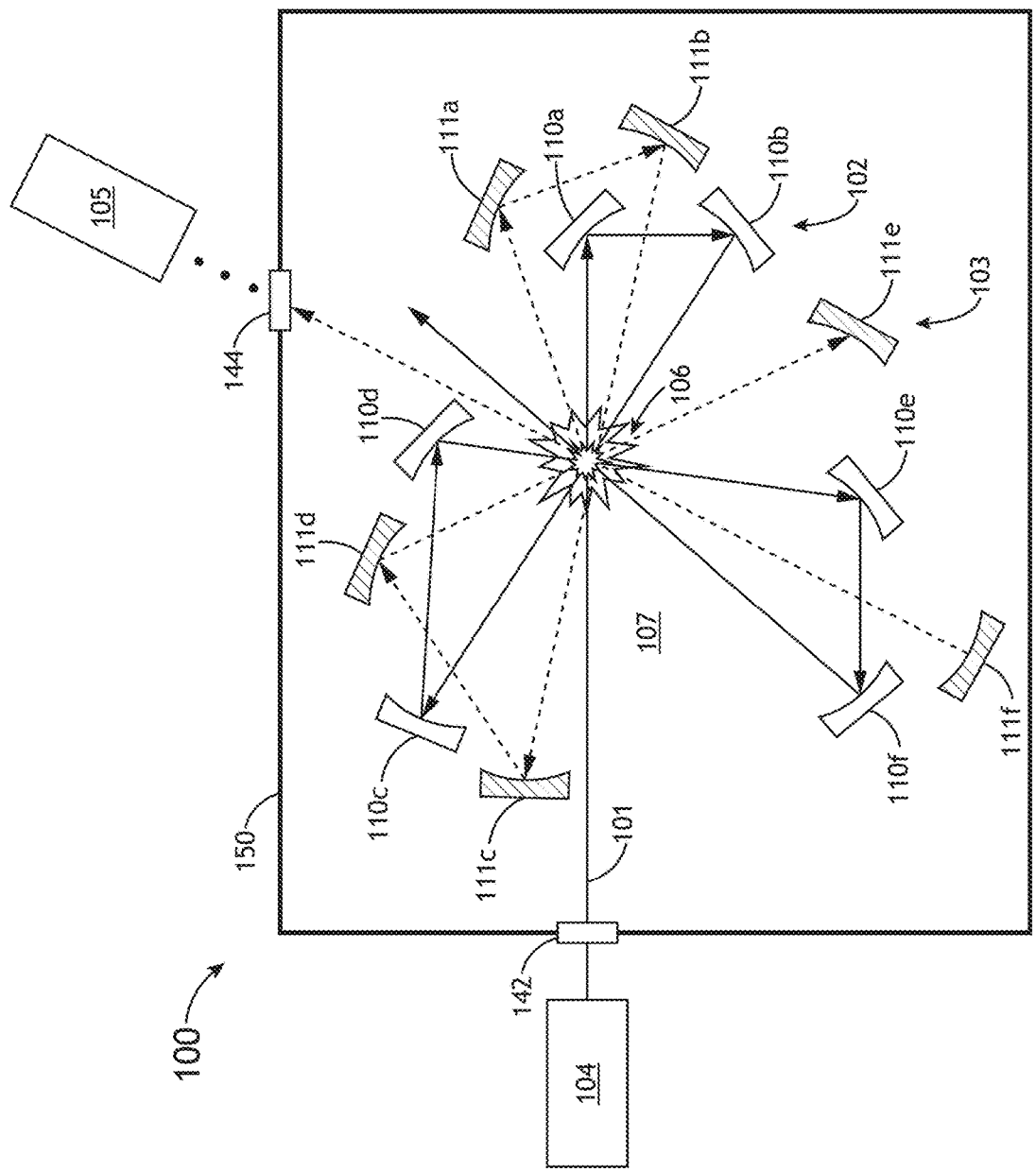

FIG. 1F illustrates system 100 equipped with a chamber 150 for containing gas 107, in accordance with one embodiment of the present disclosure. As shown in FIG. 1E, the multi-pass optical assembly 102 and/or the collection assembly 103 may be disposed within chamber 150. In another embodiment, the chamber 150 includes one or more entrance windows 142 for receiving pumping illumination 101 from the pump source 104. In another embodiment, the chamber 150 includes one or more exit windows 144 for transmitting broadband light 115 to one or more downstream optical elements 105. The use of a gas chamber as a gas containment structure is described in U.S. patent application Ser. No. 12/787,827, filed May 26, 2010; U.S. patent application Ser. No. 14/660,846, filed Mar. 17, 2015; U.S. patent application Ser. No. 14/670,210, filed Mar. 26, 2015; U.S. patent application Ser. No. 14/224,945, filed Mar. 25, 2014, which are each incorporated herein by reference in the entirety.

The transmitting portion of the gas containment structure of system 100 (e.g., transmission element, bulb or window) may be formed from any material known in the art that is at least partially transparent to the broadband light 115 generated by plasma 106 and/or the pump illumination 101. In one embodiment, one or more transmitting portions of the gas containment structure (e.g., transmission element, bulb or window) may be formed from any material known in the art that is at least partially transparent to EUV radiation, VUV radiation, DUV radiation, UV radiation, NUV radiation and/or visible light generated within the gas containment structure. Further, one or more transmitting portions of the gas containment structure may be formed from any material known in the art that is at least partially transparent to IR radiation, visible light and/or UV light from the pump source 104. In another embodiment, one or more transmitting portions of the gas containment structure may be formed from any material known in the art transparent to both radiation from the pump source 104 (e.g., IR source) and radiation (e.g., EUV, VUV, DUV, UV, NUV radiation and/or visible light) emitted by the plasma 106.

In some embodiments, the transmitting portion(s) of the gas containment structure may be formed from a low-OH content fused silica glass material. In other embodiments, the transmitting portion(s) of the gas containment structure may be formed from high-OH content fused silica glass material. For example, the transmission element, bulb or windows of the gas containment structures 140, 150 may include, but is not limited to, SUPRASIL 1, SUPRASIL 2, SUPRASIL 300, SUPRASIL 310, HERALUX PLUS, HERALUX-VUV, and the like. In other embodiments, the transmission element, bulb or windows of the gas containment structures 140, 150 may include, but is not limited to, calcium fluoride, magnesium fluoride, lithium fluoride, crystalline quartz and sapphire. Various glasses suitable for implementation in the gas containment structure of the present disclosure are discussed in detail in A. Schreiber et al., *Radiation Resistance of Quartz Glass for VUV Discharge Lamps*, J. Phys. D: Appl. Phys. 38 (2005), 3242-3250, which is incorporated herein by reference in the entirety.

In one embodiment, the gas containment structures 140 and/or 150 may contain any selected gas (e.g., argon, xenon, mercury or the like) known in the art suitable for generating a plasma upon absorption of pump illumination. In one embodiment, the focusing of pump illumination 101 from the pump source 104 into the volume of gas 107 causes energy to be absorbed by the gas or plasma (e.g., through one or more selected absorption lines) within the gas containment structure, thereby "pumping" the gas species in order to generate and/or sustain a plasma 106. In another embodiment, although not shown, the gas containment structure may include a set of electrodes for initiating the plasma 106 within the internal volume of the gas containment structure, whereby the illumination from the pump source 104 maintains the plasma 106 after ignition by the electrodes.

It is contemplated herein that the system 100 may be utilized to initiate and/or sustain a plasma 106 in a variety of gas environments. In one embodiment, the gas used to initiate and/or maintain plasma 106 may include an inert gas (e.g., noble gas or non-noble gas) or a non-inert gas (e.g., mercury). In another embodiment, the gas used to initiate and/or maintain a plasma 106 may include a mixture of gases (e.g., mixture of inert gases, mixture of inert gas with non-inert gas or a mixture of non-inert gases). For example, gases suitable for implementation in system 100 of the present disclosure may include, but are not limited, to Xe, Ar, Ne, Kr, He, $N_2$, $H_2O$, $O_2$, $H_2$, $D_2$, $F_2$, $CH_4$, one or more metal halides, a halogen, Hg, Cd, Zn, Sn, Ga, Fe, Li, Na, Ar:Xe, ArHg, KrHg, XeHg, and any mixture thereof. The present disclosure should be interpreted to extend to any light pumped plasma generating system and should further be interpreted to extend to any type of gas suitable for sustaining a plasma within a gas containment structure.

Figure 1G:
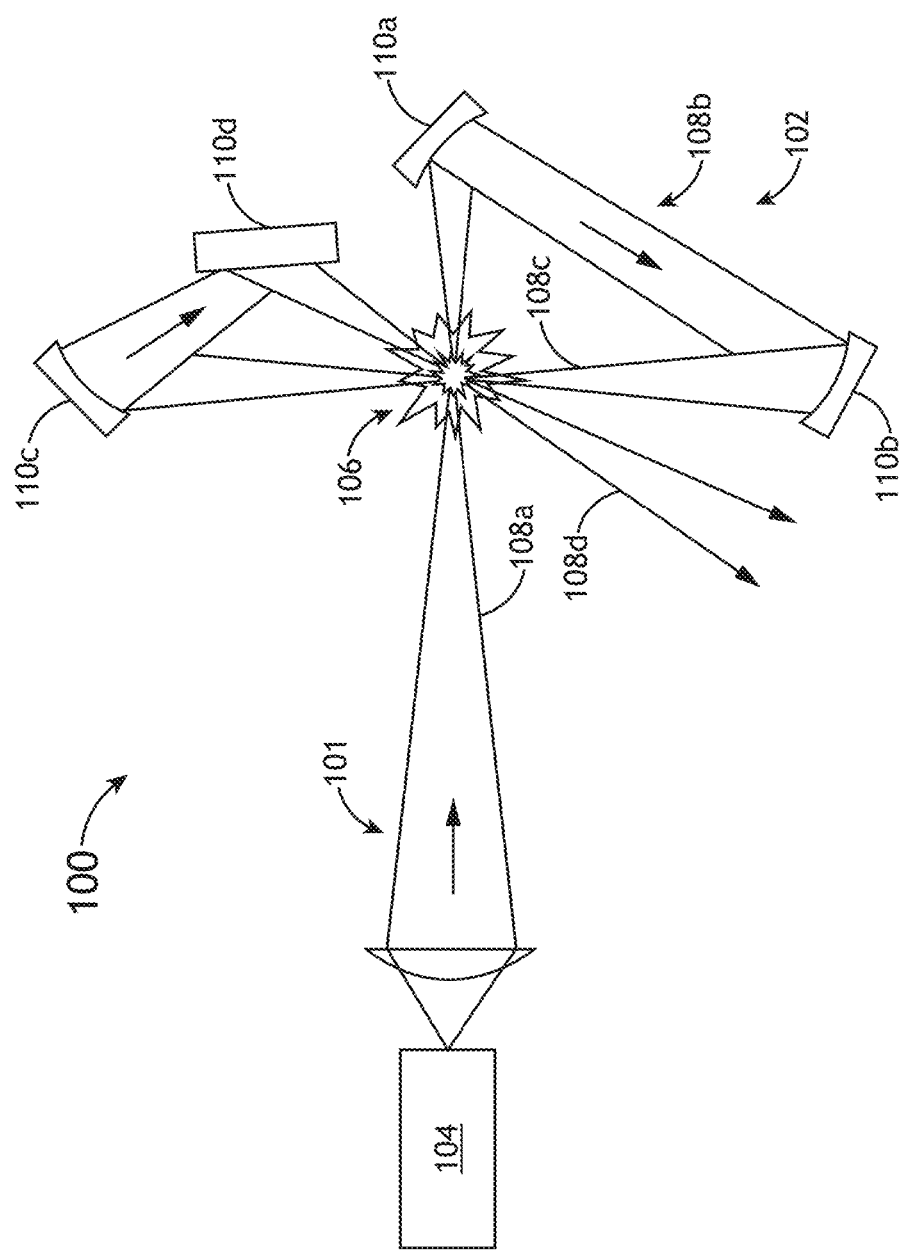
FIG. 1G illustrates the multi-pass optical assembly equipped with one or more off-axis mirrors, in accordance with one or more embodiments of the present disclosure

FIG. 1G illustrates the multi-pass optical assembly 102 equipped with one or more off-axis mirrors, in accordance with one or more embodiments of the present disclosure. In one embodiment, one or more of the mirrors is an off-axis parabolic mirror. In one embodiment, one or more of the mirrors is an off-axis elliptical mirror. In one embodiment, one or more of the mirrors is a flat mirror. In the example depicted in FIG. 1G, the multi-pass optical assembly 102 includes off-axis parabolic mirrors 110a, 110b, off-axis elliptical mirror 110c and flat mirror 110d. It is noted that the illumination passing between the off-axis parabolic mirrors 110a, 110b may be substantially collimated. In contrast, illumination reflected from the off-axis elliptical mirror 110c is focused onto plasma 106 (via reflection from flat mirror 110d). It is noted that the number, type and positioning of mirrors 110a-110d of FIG. 1G are not limitations on the scope of the present disclosure and are provided merely for illustrative purposes.

Figure 1H:
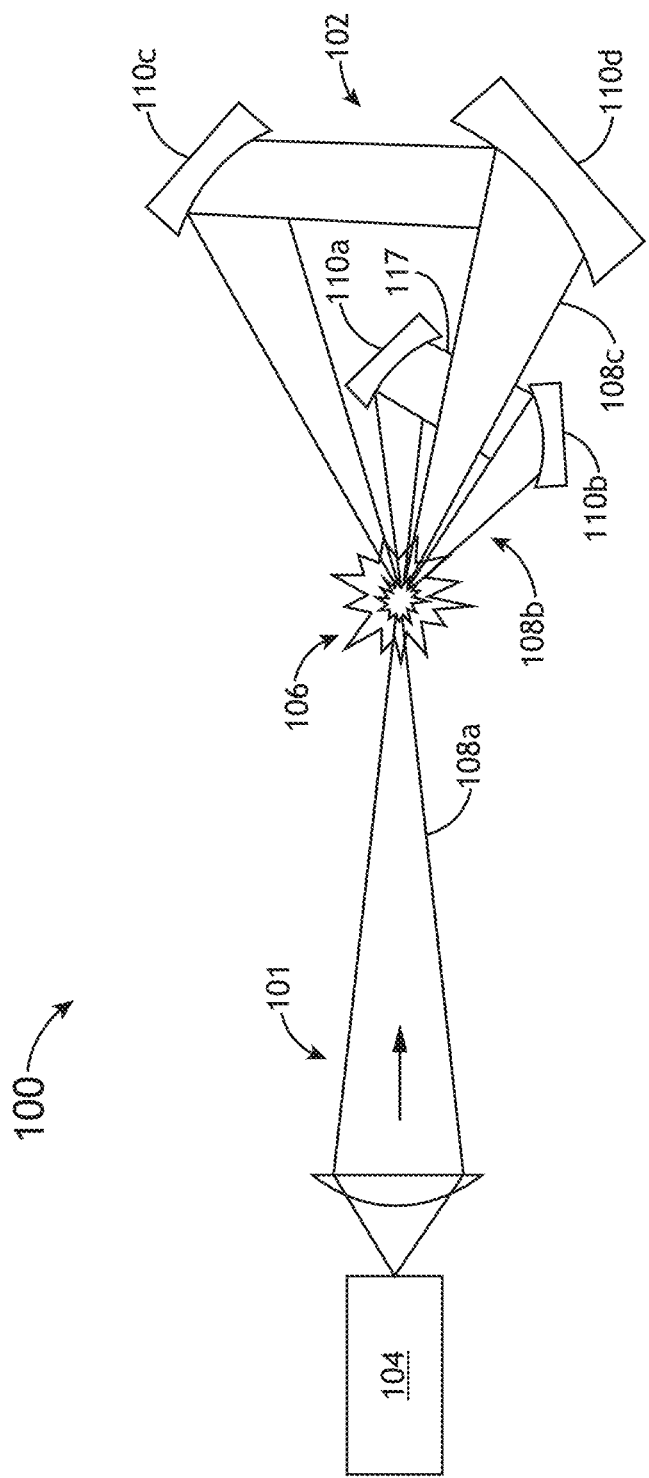
FIG. 1H illustrates the multi-pass optical assembly arranged in an optical threading configuration, in accordance with one or more embodiments of the present disclosure.

FIG. 1H illustrates the multi-pass optical assembly 102 arranged in an optical threading configuration, in accordance with one or more embodiments of the present disclosure. In one embodiment, one or more higher-order passes 108c may be threaded between the optical elements associated with the lower-order passes 108b. For example, the multi-pass optical assembly 102 may include a first set of optical elements 110a, 110b associated with a first pass 108b of the pumping beam 101 through the plasma 106 and/or gas 107 proximate to the plasma 106. In addition, the multi-pass optical assembly 102 may include an additional set of optical elements 110c, 110d associated with an additional pass 108c of the pumping beam 101 through the plasma 106 and/or gas 107 proximate to the plasma 106. In another embodiment, the first set of optical elements 110a, 110b and the additional set of optical elements 110c, 110d are arranged such that illumination of the additional pass 108c of the pumping beam 101 traverses a region 117 between the mirror 110a and 110b of the first set of optical elements. The configuration depicted in FIG. 1H should not be interpreted as a limitation on the scope of the present disclosure, but is provided merely for illustrative purposes. It is recognized herein that the embodiment of FIG. 1H may be extended to any setting where illumination from high-order reflections are threaded through lower order optical elements, as shown in FIG. 1H.

It is noted that the embodiment depicted in FIG. 1H is particularly useful in settings where NA (numerical aperture) space is limited, which is often the case during LSP applications. For example, such a constraint on available NA space may result from a desire to separate the pump illumination NA and the collection illumination NA for purposes of plasma performance (or other technical reasons). Further, it is generally desirable to use as much NA space for the purposes of plasma pumping in order to minimize the size of the plasma. It is also typically desirable to have a specific pump intensity distribution in the NA space, such as, but not limited to, a uniform intensity distribution. The implementation of the optical threading embodiment described above, whereby illumination from a higher-order pass is directed between the optical elements (e.g., steering mirrors) of an earlier lower-order pass, is particularly useful. Such a configuration aids in maximizing the usable NA space for LSP pumping.

Figure 1I:
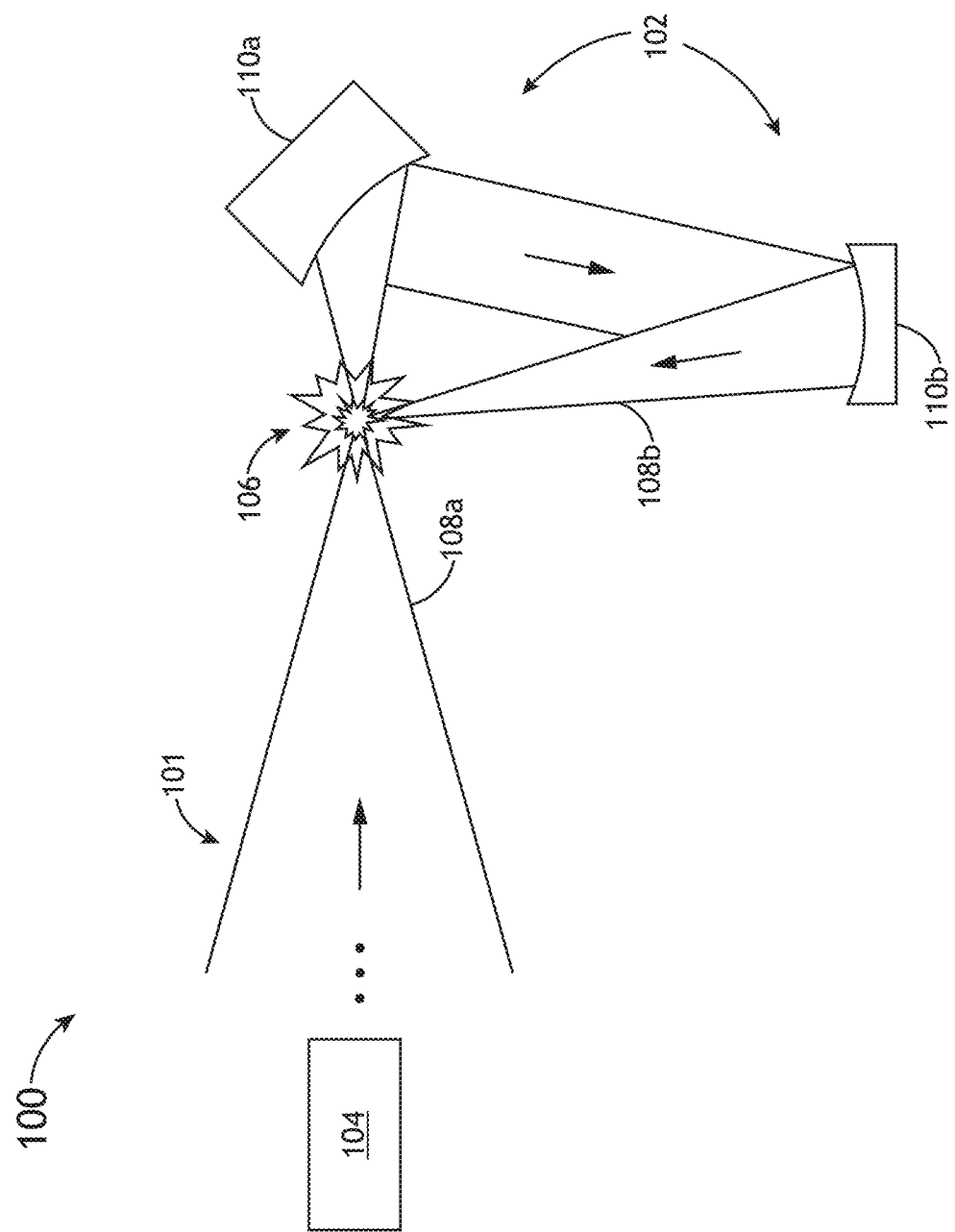
FIG. 1I illustrates the multi-pass optical assembly arranged such that the NA of the illumination decreases upon one or more successive passes through the plasma, in accordance with one or more embodiments of the present disclosure.

FIG. 1I illustrates the multi-pass optical assembly 102 arranged such that the NA of the illumination decreases upon one or more successive passes through the plasma 106, in accordance with one or more embodiments of the present disclosure. For example, the one or more optical elements 110a and 110b of the multi-pass assembly 102 may be arranged such that the NA of the pumping beam 101 during a second pass 108b through the plasma 106 and/or the gas 107 proximate to the plasma 106 is lower than the NA of the pumping beam 101 during a first pass 108a through the plasma 106 and/or the gas near the plasma 106. It is noted that due to the absorption of the pump beam 101 along each successive path the focusing NA of the successive higher-order passes may be decreased to maintain approximately the same intensity distribution in the NA space as for the lower-order passes. Such an arrangement allows the pump illumination to be distributed more evenly in the NA space designated for plasma pumping. In another embodiment, the optical elements of the multi-pass optical assembly 102 may be arranged so as to establish a variation of NA for successive passes of the pumping beam 101 in order to create a selected pump intensity distribution in NA space.

FIGS. 1J and 1K illustrate the control of the shape of the plasma 106 using the multi-pass optical assembly 102, in accordance with one or more embodiments of the present disclosure. The one or more optical elements of the multi-pass optical assembly 102 may be arranged to control a shape of the plasma 106 by controlling a position of each focal point associated with each pass of the pumping beam 101 through the plasma 106 and/or gas 107 proximate to the plasma 106. In one embodiment, as shown previously herein, the one or more optical elements 110a, 110b are arranged such that the focal points of each of the passes of the pumping beam 101 substantially overlap to form a spot. In another embodiment, as shown in FIG. 1J, the one or more optical elements 110a, 110b are arranged so as to displace a focal point of a first pass 108a of the pumping beam relative to a focal point of at least an additional pass 108b of the pumping beam so as to form an elongated plasma region 121. In another embodiment, as shown in FIG. 1K, the one or more optical elements 110a, 110b are arranged so as to focus the illumination from each successive path 108a, 108b to a line, thereby forming an elongated plasma region 121. In one embodiment, one or more of the optical elements of the multi-pass assembly 102 may be arranged in the same plane as the pump source 104. In another embodiment, one or more of the optical elements of the multi-pass assembly 102 may be arranged outside of the plane defined by the pump source 104, thereby forming a three-dimensional distribution of the pump beam 101 in NA space.

It is noted that the arrangement and plasma shapes described above are not limitations on the scope of the present disclosure and are provided merely for illustration purposes. The positioning of the focal points of the multiple passes may be controlled in any suitable way to form a plasma region having any suitable shape.

Figure 1L:
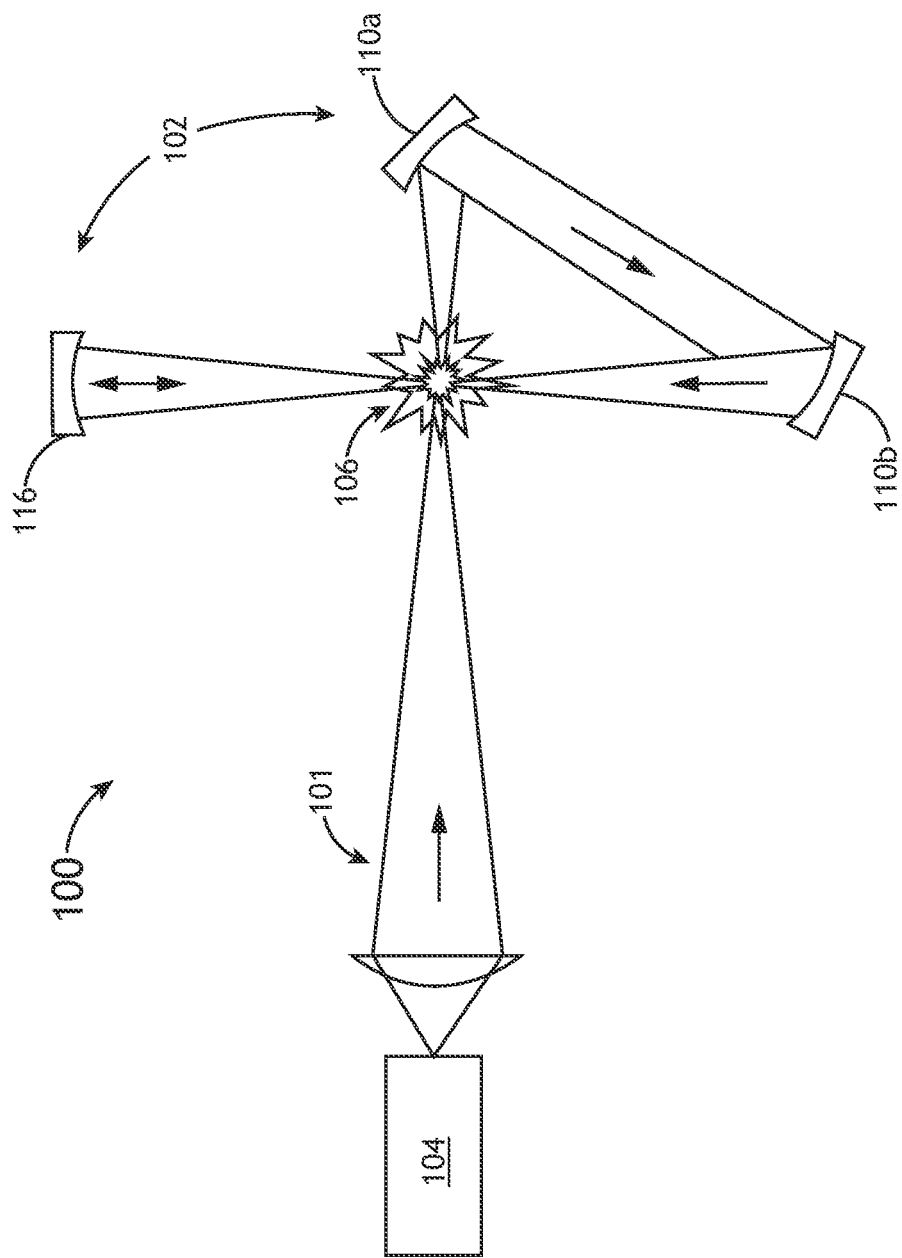
FIG. 1L illustrates the multi-pass optical assembly equipped with one or more retro-reflector assemblies, in accordance with one or more embodiments of the present disclosure.

FIG. 1L illustrates the multi-pass optical assembly 102 equipped with one or more retro-reflector assemblies, in accordance with one or more embodiments of the present disclosure. In one embodiment, one or more of the optical elements of the multi-pass optical assembly 102 includes one or more retro-reflector assemblies. For example, the multi-pass optical assembly 102 may include, but is not limited to, retro-reflector 116. The retro-reflector 116 may include, but is not limited to, a spherical mirror. In this embodiment, following the first pass of pump illumination 101 through the plasma 106, mirrors 110a, 110b collect and direct the unabsorbed pump illumination 101 back through the plasma 106 to execute a second pass. In turn, the retro-reflector 116, receives the unabsorbed pump illumination from the second pass and reflects the pump illumination back through the plasma 106 to execute a third pass of pump illumination 101 through the plasma 106. It is noted that the utilization of a retro-reflector effectively doubles the number of passes through for a given of the optical system.

Figure 1M:
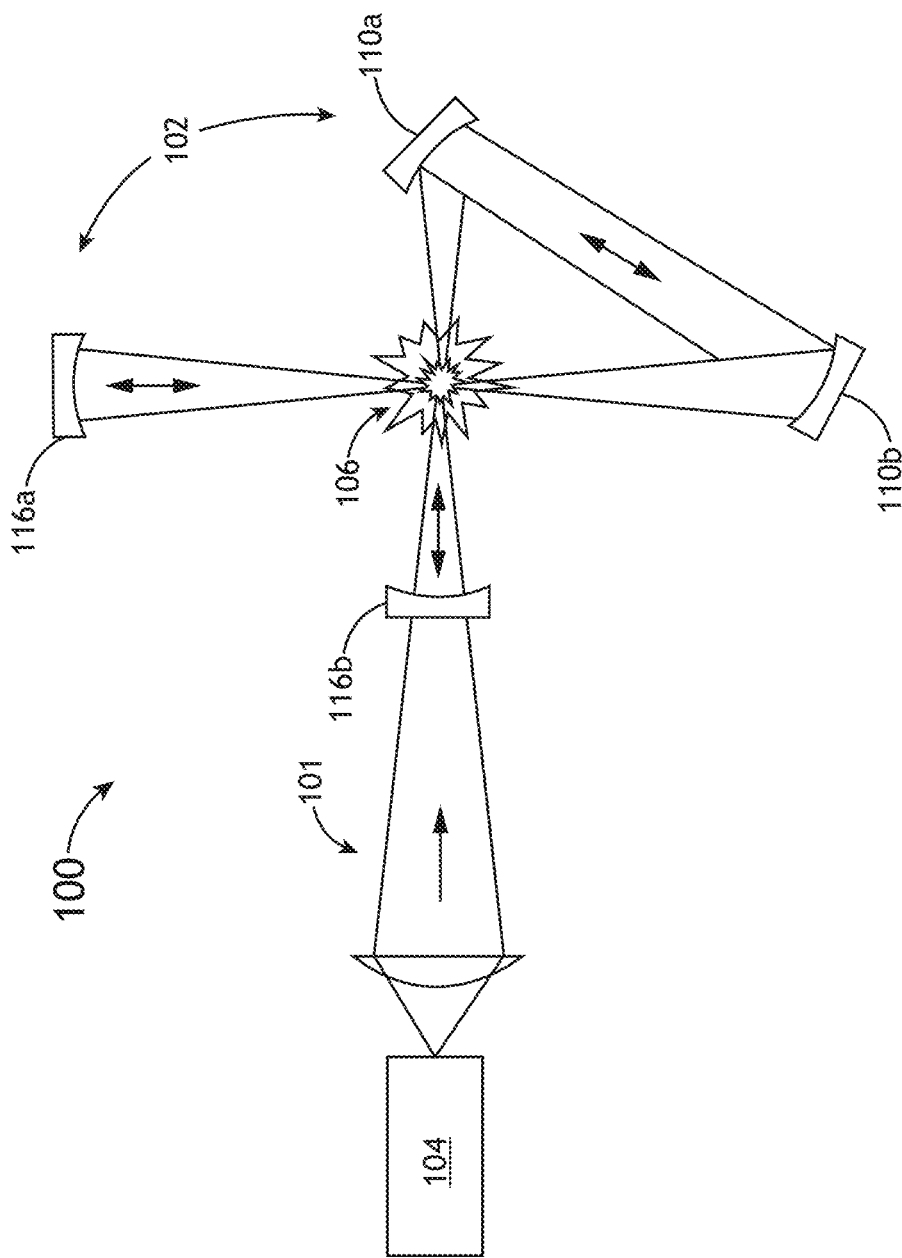
FIGS. 1M-1N illustrate the multi-pass optical assembly including one or more retro-reflector assemblies arranged in a resonator configuration, in accordance with one or more embodiments of the present disclosure.
Figure 1N:
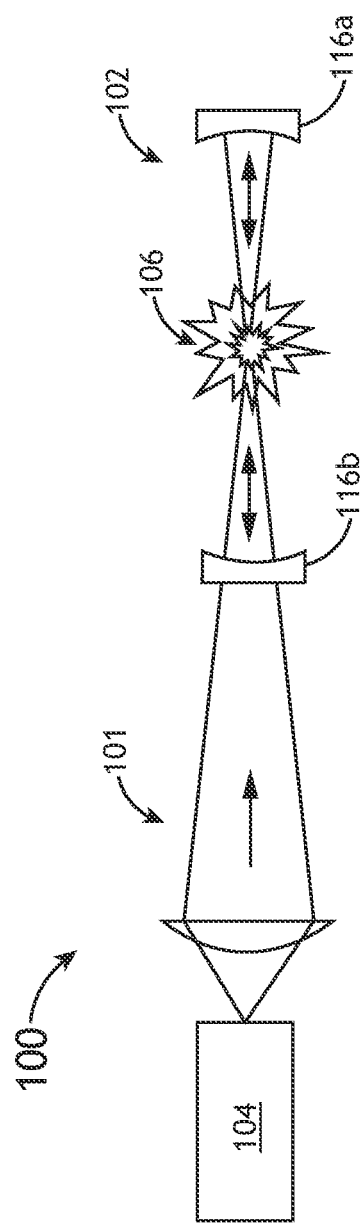
Figure 10:
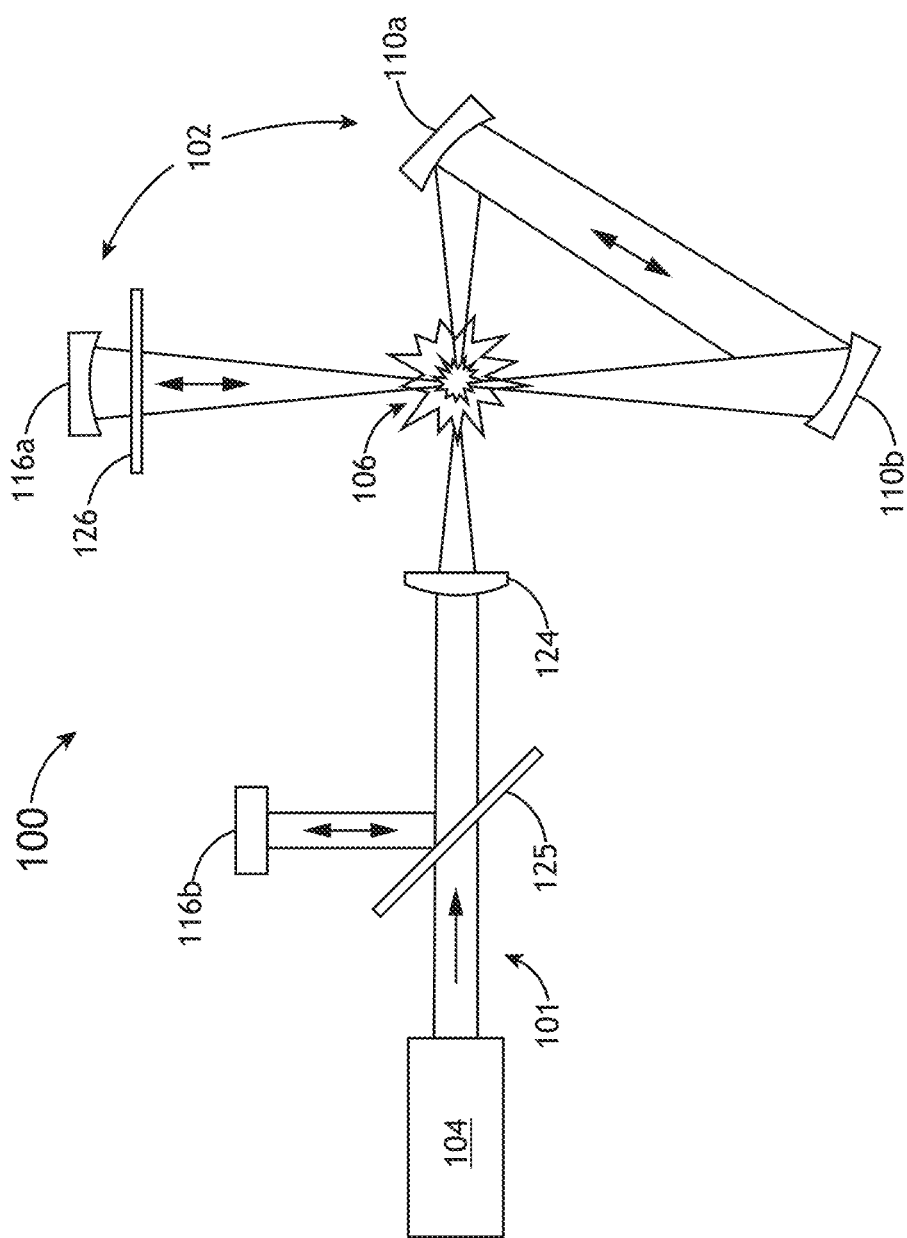

FIGS. 1M-1N illustrate the multi-pass optical assembly 102 including one or more retro-reflector assemblies arranged in a resonator configuration, in accordance with one or more embodiments of the present disclosure. In one embodiment, as shown in FIG. 1M, the multi-pass optical assembly 102 may include, but is not limited to, two or more retro-reflectors 116a, 116b arranged in a resonator configuration. In this regard, the first retro-reflector 116a and the second retro-reflector 116b form a resonator. In this embodiment, following the first pass of pump illumination 101 through the plasma 106, mirrors 110a, 110b collect and direct the unabsorbed pump illumination 101 back through the plasma 106 to execute a second pass. In turn, the first retro-reflector 116a (e.g., spherical mirror), receives the unabsorbed pump illumination from the second pass and reflects the pump illumination back through the plasma 106 to execute a third pass of pump illumination 101 through the plasma 106. In turn, mirrors 110b, 110a then return the light of the third pass back through the plasma 106 to execute a fourth pass through the plasma 106. Then, the second retro-reflector 116b receives the light from the fourth pass and repeats the optical path sequence.

In one embodiment, as shown in FIG. 1N, the multi-pass optical assembly 102 may include, but is not limited to, two or more retro-reflectors 116a, 116b arranged in a simple resonator configuration. In this regard, the first retro-reflector 116a and the second retro-reflector 116b form a simple resonator. In this embodiment, following the first pass of pump illumination 101 through the plasma 106, the first retro-reflector 116a (e.g., spherical mirror), receives the unabsorbed pump illumination from the first pass and reflects the pump illumination back through the plasma 106 to execute a second pass of pump illumination 101 through the plasma 106. In turn, the second retro-reflector 116b receives the light from the second pass and repeats the optical path sequence. It is noted that the number and arrangement of retro-reflectors provided above are not limitations on the scope of the present disclosure and are provided merely for illustrative purposes.

FIG. 1O illustrate the multi-pass optical assembly 102 equipped with one or more polarizer elements, in accordance with one or more embodiments of the present disclosure. In one embodiment, the multi-pass optical assembly 102 includes a polarizer 125 and a quarter-wave plate 126 for executing polarization rotation in the multi-pass assembly 102. In one embodiment, the pump illumination 101 is horizontally polarized and passes through polarizer 125 to lens 124, which focuses the illumination 101 into the plasma 106. In turn, mirrors 110a and 110b collect the unabsorbed illumination and redirect it back through the plasma 106 to execute a second pass. Then, the unabsorbed illumination from the second pass passes through the quarter-wave plate 126 to retro-reflector 116a and is reflected back through the quarter-wave plate 126 causing a flip in the polarization to vertical polarization. The vertically-polarized pump illumination then retraces the optical assembly, executing a third and fourth pass, back to the polarizer 125, which reflects the vertically polarized illumination to retro-reflector 116b (e.g., flat mirror). The retro-reflector 116b then reflects the illumination back to the polarizer 125 and the illumination is transmitted back through the optical assembly 102. It is noted that the number and arrangement of retro-reflectors and polarization/wave-plate elements provided above are not limitations on the scope of the present disclosure and are provided merely for illustrative purposes. In another embodiment, polarization rotation may be carried out in the multi-pass optical assembly 102 using multiple reflections from the mirrors arranged out of the plane defined by the pump illumination from the pump source 104.

Figure 1P:
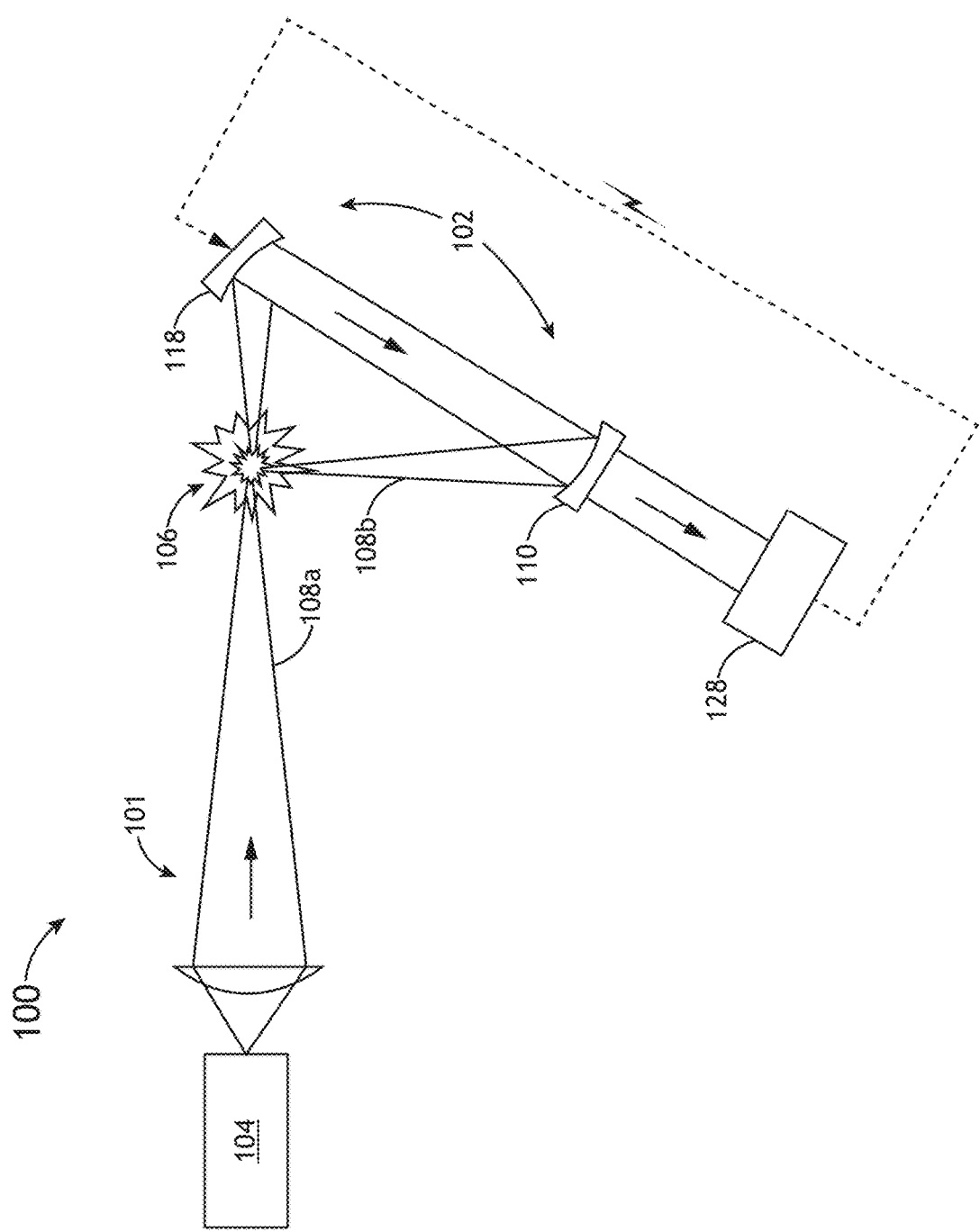
FIGS. 1P-1Q illustrate the multi-pass optical assembly equipped with one or more wavefront sensors for measuring aberration in the multi-pass optical assembly, in accordance with one or more embodiments of the present disclosure.
Figure 1Q:
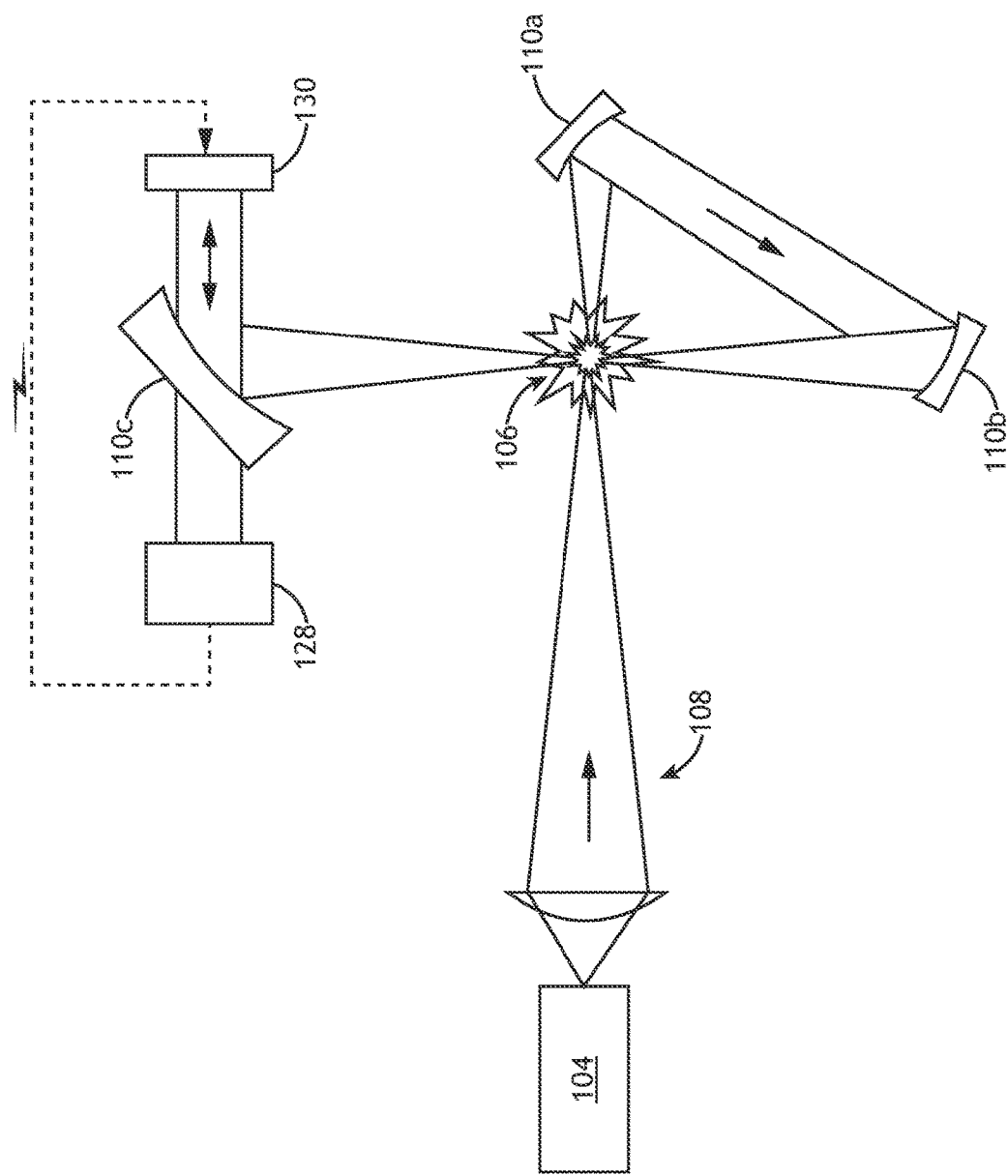

FIGS. 1P-1Q illustrate the multi-pass optical assembly 102 equipped with one or more wavefront sensors for measuring aberration in the multi-pass optical assembly, in accordance with one or more embodiments of the present disclosure. It is noted that aberrations in the multi-pass assembly 102 may accumulate in the transmitted pump laser wavefront after passing through the plasma 106 multiple times. Aberrations may result from the variation of the index of refraction in the plasma and surrounding gas. These aberrations prevent efficient focusing of the laser on the subsequent passes. In one embodiment, the multi-pass optical assembly 102 may be configured to correct or at least reduce these aberrations. In one embodiment, the multi-pass assembly 102 includes one or more wave-front sensors 128 and one or more adaptive optical elements 118 communicatively coupled to the wave-front sensor 128. In another embodiment, the one or more wave-front sensors 128 may collect illumination along one or more of the pumping paths of the multi-pass assembly 102 and measure for aberration. In turn, the wave-front sensor 128 may transmit this measurement to one or more adaptive optical elements 118, which may then adjust the wave-front of the beam reflecting off of the adaptive optical element 118 in order to compensate for the aberration measured at the wave-front sensor 128. The adaptive optical element may include any adaptive optical element known in the art, such as, but not limited to, a digital micromirror array device.

In another embodiment, as shown in FIG. 1Q, the adaptive optical element may include an adaptive retro-reflector 130 (e.g., adaptive spherical mirror). In this regard, the adaptive retro-reflector 130 may serve to reflect pump illumination back into the plasma 106, while also acting to correction aberrations measured by the one or more wave-front sensors 128.

In another embodiment, although not shown, the system 100 may include one or controllers communicatively coupled to the one or more wave-front sensors 128 and the one or more adaptive optical elements 118 and/or 130. In this regard, the one or more controllers may receive the wave-front data from the one or more wave-front sensors 128 and analyze the data for aberrations. In turn, the controller may send one or more control signals to the one or more adaptive optics to direct the one or more adaptive optics to compensate for the measured aberration. The controller may include one or more processors and one or more memory for storing program instructions. The program instructions may be pre-programmed to cause the one or more processors to execute the about steps.

FIGS. 2A-2H illustrate a multi-pass system 100 equipped with a reflector assembly 202, in accordance with one or more embodiment of the present disclosure. The reflector assembly 202 of this embodiment may provide for radiances that are much closer to the blackbody limit. The collection of multiple passes through a plasma allows for the optimization of the gas pressure as if the plasma was much larger. As a result, the absorption/emissivity of the desired broadband output wavelengths in the plasma per each pass can be reduced. In the case where a similar geometry is used for the pumping illumination, the absorption of pumping illumination can be reduced as well, allowing for a lower gas pressure. The operation of system 100 at lower gas pressure aids in reducing "gas wiggle," which result from density and temperature gradients leading to variations in the refractive index.

In addition, light emitted by the plasma 106 of the reflector assembly 202 at angles that do not take it to an output port are always focused back to (or proximate to) the plasma(s). As a result, light that would normally be lost is partially used to pump the plasma(s). Such a configuration results in an improvement of efficiency of the system 100 relative to single-pass systems and allows for a less powerful pump source 104 to achieve a given broadband radiance.

Figure 2A:
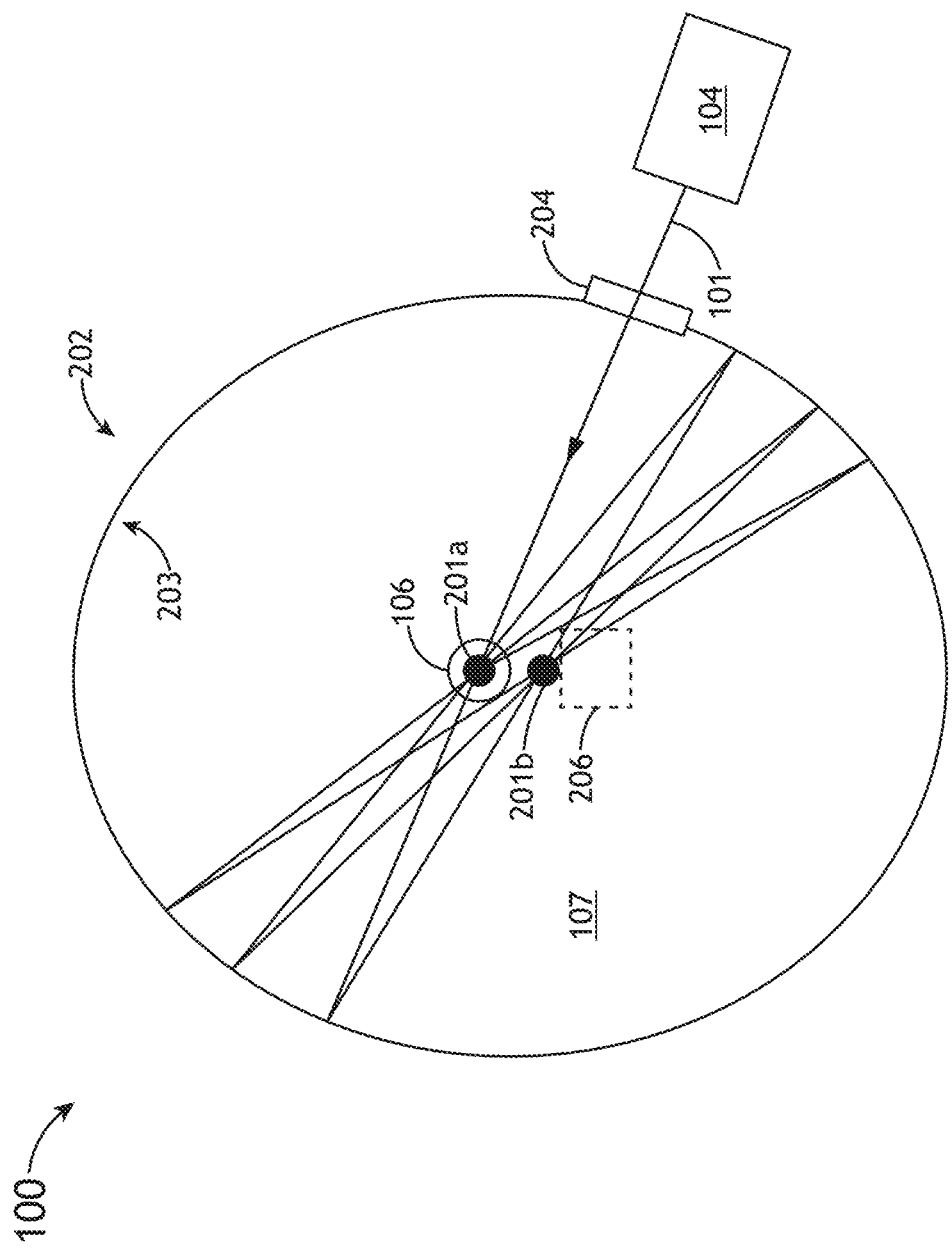
FIGS. 2A-2H illustrate a multi-pass system equipped with a reflector assembly, in accordance with one or more embodiment of the present disclosure.
Figure 2B:
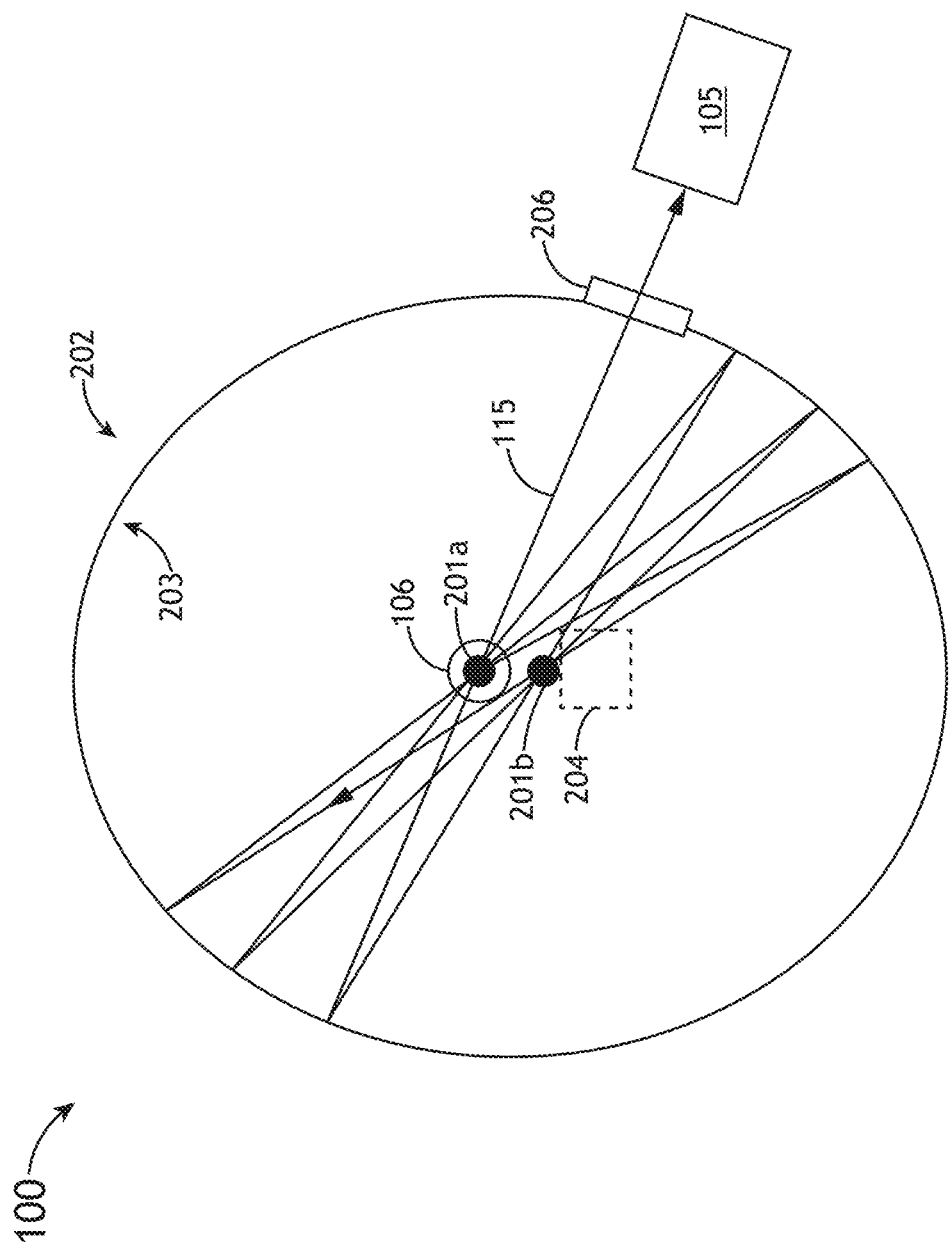

FIGS. 2A-2B illustrate cross-sectional views of the reflector assembly 202 of system 100, in accordance with one or more embodiments of the present disclosure. It is noted that FIG. 2A represents a cross-section that is perpendicular with respect to the cross-section of FIG. 2B.

In one embodiment, the system 100 includes the pump source 104 and the reflector assembly 202. The pump source 104 may include one or more illumination sources. For example, the pump source 104 may include a single illumination source or multiple discrete illumination sources (see FIGS. 2G-2H). It is noted that the pump source 104 may consist of any of the pump sources 104 discussed previously herein. In one embodiment, the reflector assembly 202 serves as a pressure vessel for containing gas 107. It is noted that the reflector assembly 202 may contain any gas described throughout the present disclosure, including, but not limited to, Ar, Xe, Ne, $N_2$, $H_2$ or mixtures thereof. In another embodiment, the reflector assembly 202 may maintain a pressure of the gas 107 between a pressure of 1 and 100 atm.

In another embodiment, the wavelength of the pump illumination may be adjusted to match an absorption line of the gas 107 so that gas efficiently absorbs the pump illumination 101. This approach is particularly useful in low density settings.

In another embodiment, the reflector assembly 202 includes one or more entrance apertures 204 for receiving the pumping beam 101 (see FIG. 2A) from the illumination source 104. In another embodiment, the reflector assembly 202 includes one or more exit apertures 206 for passing at least a portion of the broadband radiation 115 (see FIG. 2B) from an internal volume of the reflector assembly to one or more downstream optical elements 105.

In one embodiment, the reflector assembly 202 is an ellipsoid-shaped shell having a reflective internal surface 203. In one embodiment, as shown in FIG. 2A, pump illumination 101 enters the reflector assembly 202 and is focused to a first focus 201a of the reflector assembly 202 by the reflective internal surface 203. In response to the excitation energy from the pump illumination 101, a plasma is sustained (initiated and/or maintained) at the first focus 201a. In turn, as shown in FIG. 2B, broadband light is 115 is emitted from the plasma 106. In another embodiment, the internal reflective surface of the reflector assembly 202 is configured to collect at least a portion of the broadband radiation emitted by the plasma and direct the collected broadband radiation back to the plasma 106. This process is repeated until a given portion of the broadband light 115 is absorbed by the plasma 106 or exits the exit aperture 206. In this regard, the internal reflective surface 203 of the reflector assembly 202 serves to combine two or more images of the plasma 106 such that an output portion of the broadband radiation 115 has a brightness larger than a brightness of a single image of the plasma 106. It is noted that the path of the redirected broadband light 115 may first pass through the second focus 201b prior to reaching the first focus 201a.

In one embodiment, the ellipsoid-shaped reflector assembly 202 includes a single ellipsoid shell. In another embodiment, the ellipsoid-shaped reflector assembly 202 includes a partial ellipsoid shell. It is noted that light coupled through the exit aperture 206 comes from a limited footprint on the ellipse. As such, an entire ellipsoid shell is not always necessary. In this case, a partial ellipsoid shell may be implemented, which is formed from multiple elements to cover the portions of the ellipsoid where light will strike. For example, the partial ellipsoid shell may include any two or more sections of a full ellipsoid surface.

In one embodiment, the output angle and foci 201a, 201b separation may be chosen such that the middle portion of the ellipsoid does not receive broadband light. In this case, the reflector assembly 202 may include two elliptical collectors, which represent top and bottom portions of a full ellipsoid. Such a configuration also allows for the use of a second, larger ellipsoid to surround the elliptical collectors to bring laser light in from all directions to the plasma 106, providing a smaller, hotter plasma 106. The utilization of elliptical collectors, rather than a full ellipsoid, will relax requirements for the coating process for the internal reflective surface.

The entrance aperture 204 and/or exit aperture 206 may be fitted with one or more windows. The windows of the entrance aperture 204 and/or exit aperture 206 may be formed from any material known in the art. For example, the window of the entrance aperture 204 and/or the window of the exit aperture 206 may include one or more of the following materials: sapphire, fused silica, crystal quartz, magnesium fluoride, calcium fluoride, lithium fluoride. In another embodiment, the window of the entrance aperture 204 may be curved so as to shape and/or focus the pump illumination 101.

The pump source 104 may include one or more illumination sources. For example, the pump source 104 may include a single illumination source or multiple discrete illumination sources (see FIGS. 2G-2H). It is noted that the pump source 104 may consist of any one or more the pump sources 104 discussed previously herein. In another embodiment, the pump source 104 may include a directly coupled pump source (e.g., directly coupled laser diode). In another embodiment, the pump source 104 may include a fiber coupled pump source.

In one embodiment, not shown in FIG. 2A, the pump illumination 101 may perform a single pass through the plasma 106 located at a first focus 201a of the ellipsoidal reflector assembly 202. In this embodiment, the reflector assembly 202 may include an additional exit aperture for passing the unabsorbed pump illumination transmitted through the plasma 106 to a region external to the reflector assembly 202.

In another embodiment, as shown in FIG. 2A, the reflector assembly 202 is configured to recycle pump illumination 101. In this regard, the internal reflective surface 203 of the reflector assembly 202 is configured to collect an unabsorbed portion of the pumping beam 101 transmitted through the plasma 106 located at the first focus 201a and direct the collected unabsorbed portion of the pumping beam back into plasma 106 or gas 107 located near the plasma 106. It is noted that the path of the redirected pump illumination 101 may first pass through the second focus 201b prior to reaching the first focus 201a.

In another embodiment, although not shown, the system 100 may include one or more plasma ignition units. For example, the system 100 may include one or more electrode assemblies disposed within the reflector assembly 202 for initiating the plasma 106. For example, the system 100 may include one or more electrode assemblies disposed within the reflector assembly 202 for initiating the plasma 106. By way of another example, the system 100 may include one or more RF plasma generators for initiating the plasma 106. By way of another example, the system 100 may initiate the plasma 106 using laser light from the pump source 104 or from an additional laser source dedicated to plasma ignition.

In another embodiment, the gas 107 may be pre-ionized prior to injection into the ellipsoidal reflector assembly 202. For example, the gas 107 may be pre-ionized via one or more of electrical ionization, laser ionization or RF ionization. For instance, the system 100 may include one or more of an additional set of electrodes, an additional laser ignition unit or an RF ignition unit configured to pre-ionize the gas 107 prior to the gas 107 entering the internal volume of the reflector assembly 202.

In one embodiment, as shown in FIGS. 2A and 2B, an internal surface of the ellipsoidal reflector assembly is configured to form a single plasma 106 at one of the foci 201a of the ellipsoidal reflector assembly 202.

In another embodiment, the semi-major axis of the ellipsoidal reflector assembly may be arranged vertically. In another embodiment, the semi-major axis of the ellipsoidal reflector assembly may be arranged horizontally. In another embodiment, the semi-major axis of the ellipsoidal reflector assembly may be arranged at a selected angle relative to the vertical or horizontal directions. Further, the selection of the focus with which the single plasma 106 is formed may be based on one or more factors. For example, in the case where the semi-major axis of the ellipsoidal reflector assembly is arranged vertically, the single plasma 106 may be formed at either the top focus 201a or the bottom focus 201b based on the gas flow geometry (see FIGS. 2D-2E). It is noted the position of the plasma 106 (either at focus 201a or focus 201b) may be controlled by where the plasma is initiated (e.g., initiated via electrodes, RF ignition unit or laser ignition unit).

Figure 2C:
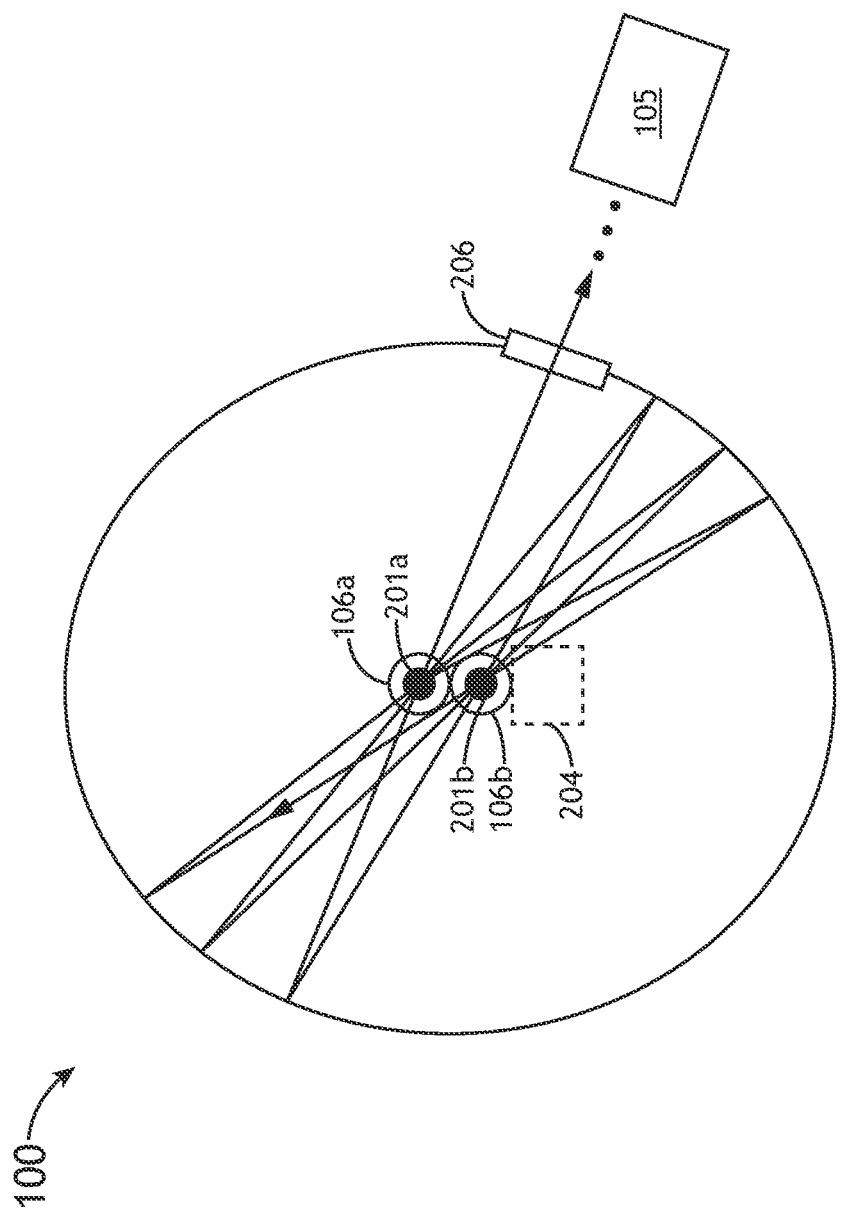

In another embodiment, as shown in FIG. 2C, two plasma regions 106a, 106b may be formed by the ellipsoidal reflector assembly 202. For example, a first plasma 106a is formed at a first focus 201a of the ellipsoidal reflector assembly 202 and a second plasma is formed at a second focus 201b of the ellipsoidal reflector 202. Such a double-plasma configuration reduces the number of reflections between trips through the plasma. The double-plasma configuration of FIG. 2C is particularly advantageous in spectral regimes (e.g., 100-200 nm) where the reflective surface 203 is less than an ideal reflector. In these settings, the amount of broadband light 115 collected by the system 100 will be higher if the number of reflections between trips through the plasma 106a, 106b is reduced.

In another embodiment, in the case of two plasmas 106a, 106b, the two plasmas 106a, 106b may be initiated sequentially. For example, in a vertical configuration, the lower plasma 106b may be initiated by any means described above (e.g., electrical, RF or laser). In turn, the plume from the first plasma 106a may act to ignite the upper plasma 106b.

Figure 2E:
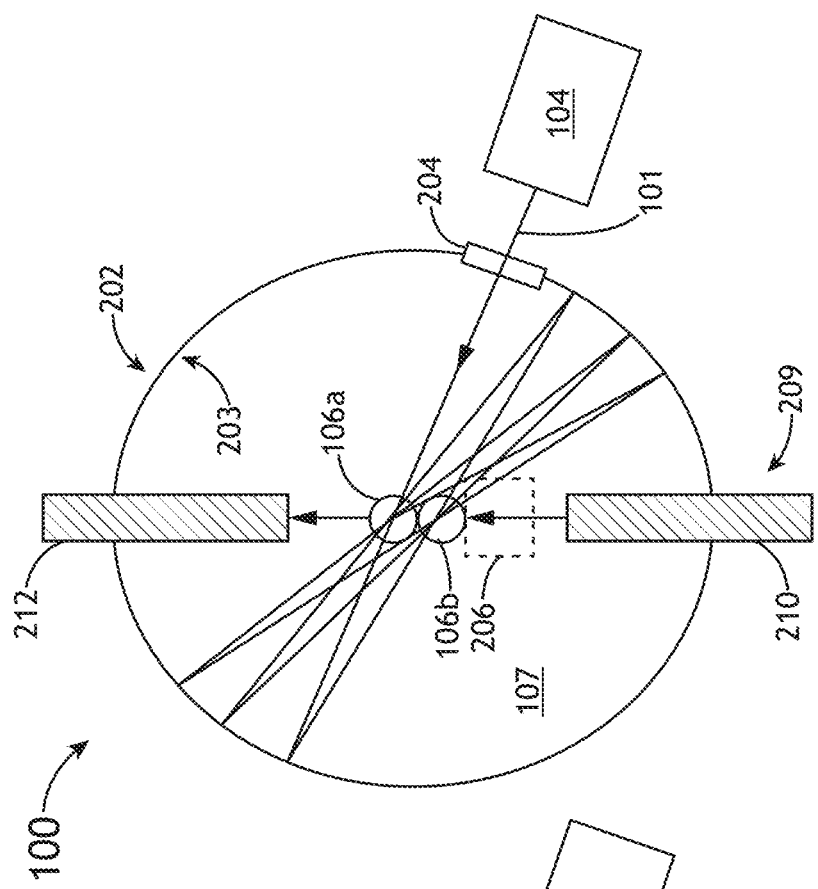
Figure 2D:
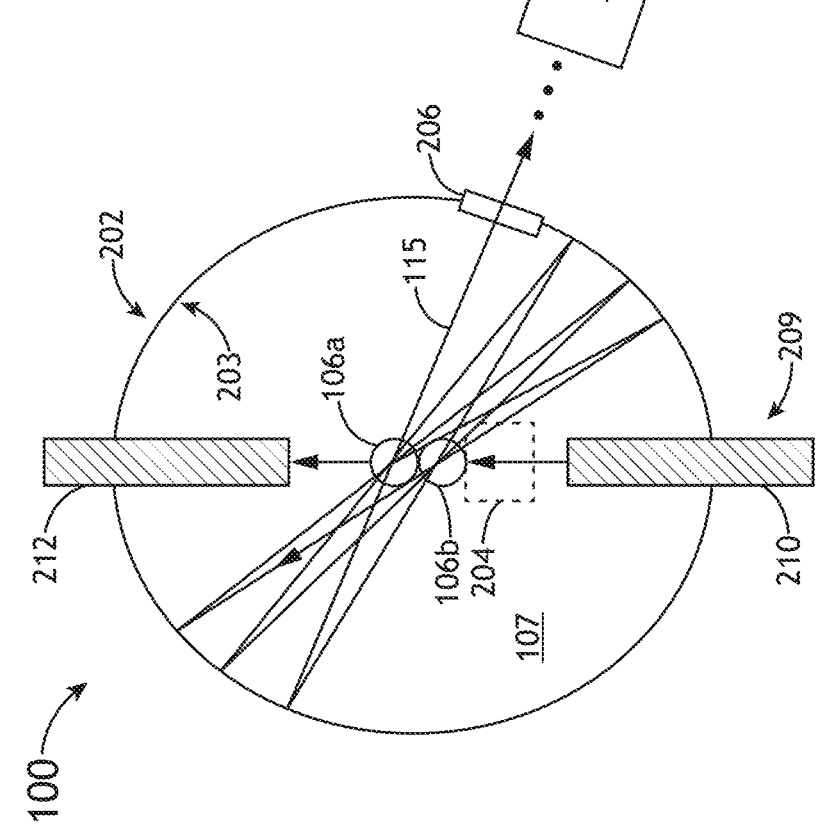

FIGS. 2D and 2E illustrate the reflector assembly 202 equipped with a gas circulation assembly 209, in accordance with one or more embodiments of the present disclosure. It is noted that the limited output ports/paths in the reflector assembly 202 results in most of the energy in the injected pump illumination beam 101 being absorbed by the gas 107 and/or the internal reflective surface 203. As a result, one or more cooling approaches may be implemented to maintain the temperature of the reflector assembly 202 at or below a temperature necessary for quality plasma operation. In one embodiment, the gas circulation assembly 209 includes a gas input port 210 and a gas output port 212 for circulating gas through the reflector assembly 202.

Figure 2F:
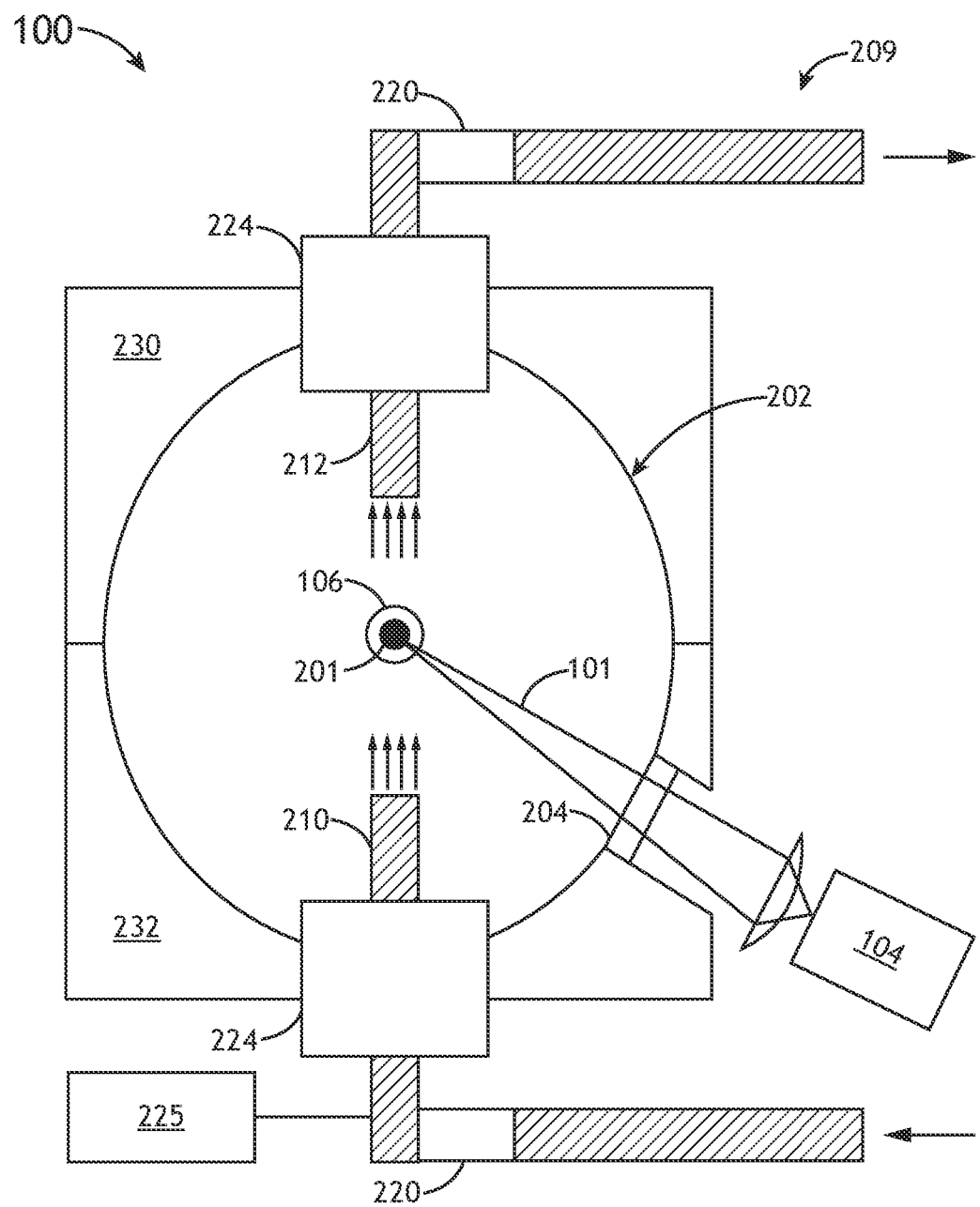

As shown in FIGS. 2D-2F, the gas input port 210 provides a stream of gas to the plasma 106a and/or 106b. The gas output port 212 then exhausts the gas 107 from the reflector assembly 202. While the embodiment of FIGS. 2D and 2E depict the gas input port 210 and gas output port 212 arranged along the same direction, this is not a limitation on the present disclosure. In another embodiment, the gas input port 210 and the gas output port 212 may be arranged such that the gas flow into the reflector assembly 202 is orientated at a selected angle relative to the gas flow out of the reflector assembly 202. In another embodiment, the gas flow may be forced and coupled to a heat sink that resides outside of the reflector assembly 202. In another embodiment, the reflector assembly 202 includes one or more convention devices and/or a heat sink arranged to cool the reflector assembly 202 via convention. Convection-based cool is described generally in U.S. patent application Ser. No. 14/288,092, filed on May 27, 2014, which is incorporated previously herein by reference in the entirety.

In one embodiment, as shown in FIG. 2F, the gas input/output ports 210, 212 may also serve as plasma ignition electrodes. For example, the system 100 may include one or more electrical feedthroughs 224. The one or more electrical feedthroughs 224 may serve to insulate metal gas input/output tubes 210, 212. Further, the gas input/output tubes 210, 212 may be electrically coupled to a high-voltage source 225 for delivering electrical energy to the gas 107 for igniting the plasma 106. In addition, the system 100 may include one or more electrical insulating sections 220 for insulating the rest of the gas circulation system 209 from the electrified gas input/output tubes 210, 212.

In another embodiment, the reflector assembly 202 is a multi-component reflector assembly. In this regard, the elliptical shell o the assembly 202 may be formed from two or more components. For example, as shown in FIG. 2F, the reflector assembly 202 may include a top portion 230 and a bottom portion 232, which when fit together form the elliptical shell of the reflector assembly 202.

In another embodiment, the individual components 230 and/or 232 may be cooled. For example, the top portion 230 and/or the bottom portion 232 of the reflector assembly 202 may be liquid cooled. For instance, top portion 230 and/or the bottom portion 232 of the reflector assembly 202 may include a liquid flow system (e.g., one or more tubes) for passing a liquid coolant (e.g., water) through the body of the components 230, 232. Further, the liquid flow system may be coupled to an external heat sink, whereby heat is transferred from the top portion 230 and/or the bottom portion 232 of the reflector assembly 202 to the heat sink view the liquid flowing in the flow system.

Figure 2G:
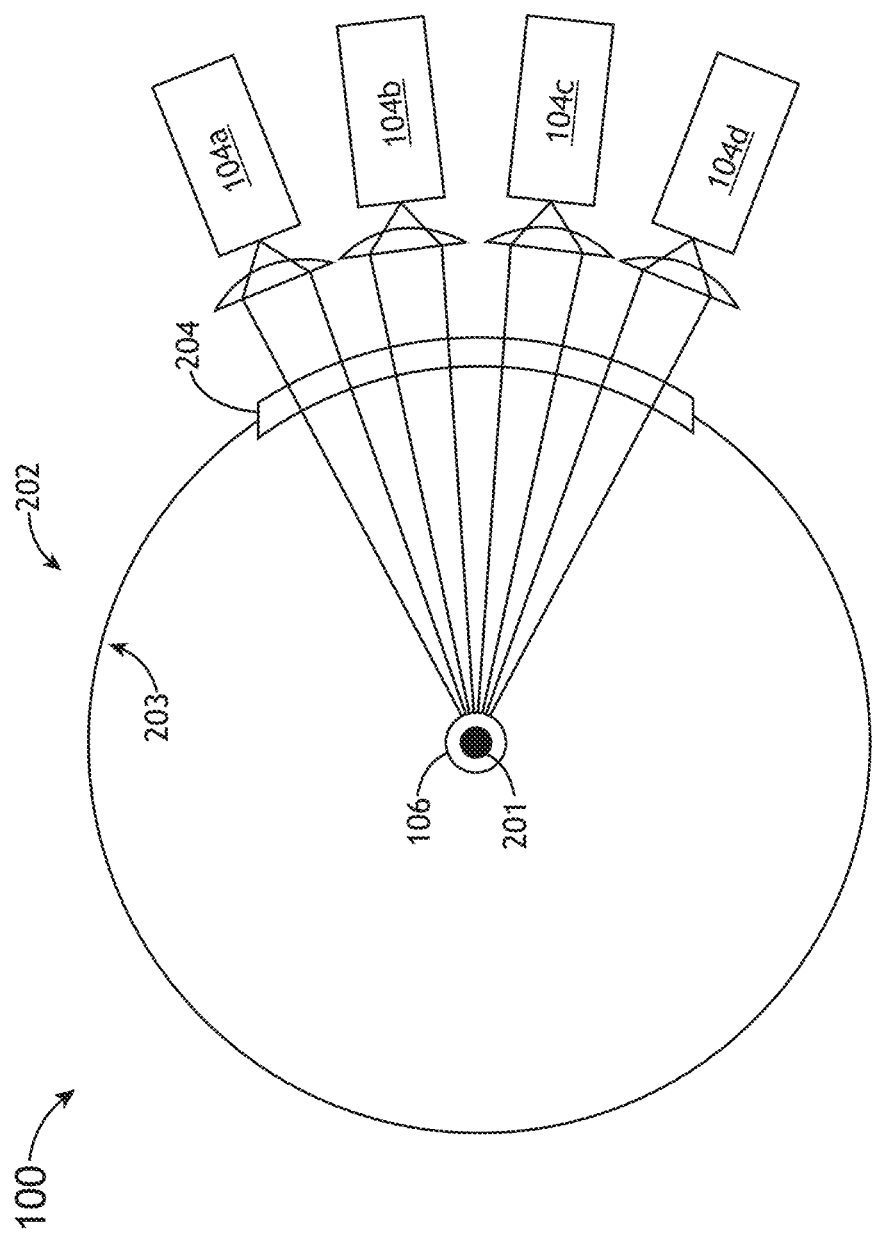
Figure 2H:
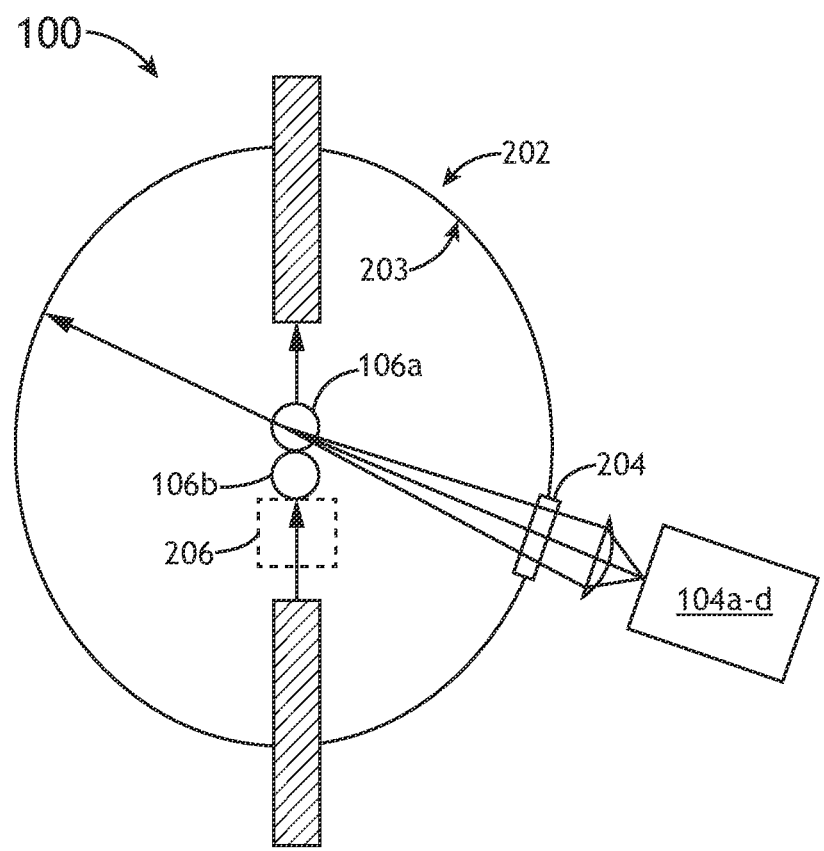

FIGS. 2G-2H illustrate a reflector assembly 202 equipped with multiple illumination sources 104a-104d, in accordance with one or more embodiments of the present disclosure. FIG. 2G and FIG. 2H illustrates a top view and side view of the reflector assembly 202, respectively. It is noted herein that the use of multiple discrete sources 104a-104d may aid in achieving high NA plasma pumping within the reflector assembly 202.

In one embodiment, the reflector assembly 202 includes a single entrance port 204 for receiving light from the discrete pump sources 104a-104d distributed about the reflector assembly 202.

In another embodiment, the reflector assembly 202 includes multiple entrance ports 204 distributed about the reflector assembly 202. In one embodiment, the multiple entrance ports 204 may be arranged on opposite sides of the ellipsoid reflector assembly 202 at different angles such that the footprints associated with each source 204 are interleaved. Such a configuration results in pumping illumination that has a more uniform intensity variation with solid angle.

In one embodiment, the multiple entrance ports 204 may be arranged so that the solid angle subtended by each illumination reflection is smaller than the previous reflection. Such a configuration may aid in maintaining the intensity of the illumination as power is absorbed by the plasma 106 as the pumping illumination 101 traverses the plasma 106.

Referring to FIGS. 2A-2F, in one embodiment, the reflector assembly 202 includes a single aperture used for laser entrance and broadband output. In this embodiment, the pumping illumination 101 may enter the reflector assembly 202 through the aperture, opposing the outgoing broadband light 115. The pumping illumination 101 and outgoing broadband light 115 may be separated utilizing a cold mirror.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   a pump source configured to generate a pumping beam;
   a gas containment structure for containing a gas;
   an optical assembly including a multi-pass optical assembly and a collection assembly, wherein the multi-pass optical assembly includes one or more optical elements configured to perform a plurality of passes of the pumping beam through a portion of the gas to sustain a broadband-light-emitting plasma; and
   wherein the collection assembly includes one or more collection optical elements wherein the one or more collection optical elements are configured to collect and direct at least a portion of broadband radiation emitted by the plasma back to the plasma, wherein the one or more collection optical elements of the collection assembly are interspersed between the one or more optical elements of the multi-pass optical assembly.

2. The system of claim 1, wherein the collection assembly is further configured to combine two or more images of the plasma.

3. The system of claim 2, wherein the collection assembly is further configured to combine the two or more images of the plasma such that an output portion of the broadband radiation has a brightness larger than a brightness of a single image of the plasma.

4. A system comprising:
   an illumination source configured to generate a pumping beam;
   a reflector assembly configured to contain a gas, wherein the reflector assembly includes one or more entrance apertures for receiving the pumping beam from the illumination source, wherein the pumping beam sustains a plasma within a portion of the gas, wherein the plasma emits broadband radiation, wherein an internal surface of the reflector assembly is configured to collect at least a portion of the broadband radiation emitted by the plasma and direct the collected broadband radiation back to the plasma, wherein the reflector assembly is arranged to collect an unabsorbed portion of the pumping beam transmitted through the portion of the gas and direct the collected unabsorbed portion of the pumping beam back into the portion of the gas.

5. The system of claim 4, wherein the reflector assembly is further configured to combine two or more images of the plasma.

6. The system of claim 5, wherein the reflector assembly is further configured to combine the two or more images of the plasma such that an output portion of the broadband radiation has a brightness larger than a brightness of a single image of the plasma.

7. The system of claim 4, wherein the reflector assembly comprises:
   an ellipsoidal reflector assembly.

8. The system of claim 7, wherein an internal surface of the ellipsoidal reflector assembly is configured to focus a portion of the broadband radiation to one or more foci of the ellipsoidal reflector assembly.

9. The system of claim 7, wherein the plasma is formed at a single focus of the ellipsoidal reflector assembly.

10. The system of claim 7, wherein a first plasma is formed at a first focus of the ellipsoidal reflector assembly and a second plasma is formed at a second focus of the ellipsoidal reflector assembly.

11. The system of claim 7, wherein the ellipsoidal reflector assembly comprises:
    a partial ellipsoidal reflector assembly.

12. The system of claim 4, wherein the reflector assembly comprises:
    a multi-component reflector assembly.

13. The system of claim 4, wherein the one or more entrance apertures of the reflector assembly includes:
    a plurality of entrance apertures for receiving pumping beams from a plurality of illumination sources.

14. The system of claim 4, wherein the one or more entrance apertures of the reflector assembly comprise:
    one or more windows formed from at least one of sapphire, fused silica, crystal quartz, magnesium fluoride, calcium fluoride or lithium fluoride.

15. The system of claim 4, wherein the reflector assembly includes one or more exit apertures for passing at least a portion of the broadband radiation from an internal volume of the reflector assembly to one or more downstream optical elements.

16. The system of claim 15, wherein the one of the one or more exit apertures of the reflector assembly comprise:
one or more windows formed from at least one of sapphire, fused silica, crystal quartz, magnesium fluoride, calcium fluoride, lithium fluoride.

17. The system of claim 4, further comprising:
a gas recirculation assembly.

18. The system of claim 17, wherein the gas recirculation assembly includes:
a gas input port; and
a gas output port for flowing the gas through an internal volume of the reflector assembly via the gas recirculation assembly.

19. The system of claim 4, wherein the reflector assembly includes:
one or more electrical feedthroughs.

20. The system of claim 4, wherein the illumination source comprises:
one or more lasers.

21. The system of claim 20, wherein the one or more lasers comprise:
at least one of one or more infrared lasers, one or more visible lasers or one or more ultraviolet lasers.

22. The system of claim 20, wherein the one or more lasers comprise:
at least one of a diode laser, a disk laser or a fiber laser.

23. The system of claim 20, wherein the one or more lasers comprise:
at least one of a narrowband laser or a broadband laser.

24. The system of claim 20, wherein the one or more lasers are configured to operate in at least one of a continuous wave (CW) mode, a pulsed mode or a modulated mode.

25. The system of claim 4, wherein the gas comprises:
at least one of an inert gas, a non-inert gas and a mixture of two or more gases.

* * * * *